United States Patent
Suzuki et al.

[19]

[11] Patent Number: 6,018,796
[45] Date of Patent: Jan. 25, 2000

[54] DATA PROCESSING HAVING A VARIABLE NUMBER OF PIPELINE STAGES

[75] Inventors: Masato Suzuki, Toyonaka; Toru Morikawa, Suita; Nobuo Higaki, Osaka; Shinya Miyaji, Hirakata, all of Japan

[73] Assignee: Matsushita Electric Industrial Co., Ltd., Osaka, Japan

[21] Appl. No.: 08/825,479

[22] Filed: Mar. 28, 1997

[30] Foreign Application Priority Data

Mar. 28, 1997 [JP] Japan ................................. 8-077313

[51] Int. Cl.$^7$ ........................................... G06F 15/00
[52] U.S. Cl. ........................ 712/42; 712/41; 713/501
[58] Field of Search ........................... 395/381, 391, 395/376, 395, 800.2, 800.23, 800.41, 800.32; 711/157, 169, 125; 712/2, 23, 41, 32, 215, 205, 92; 713/501

[56] References Cited

U.S. PATENT DOCUMENTS

| | | | |
|---|---|---|---|
| 5,014,196 | 5/1991 | Hayashi et al. | 395/800.07 |
| 5,134,562 | 7/1992 | Hattori et al. | 711/125 |
| 5,488,729 | 1/1996 | Vegesna et al. | 395/800 |
| 5,706,459 | 1/1998 | Atsushi | 395/376 |
| 5,734,598 | 3/1998 | Abbott et al. | 364/724.19 |
| 5,778,250 | 7/1998 | Dye | 395/800.32 |

FOREIGN PATENT DOCUMENTS

| | | |
|---|---|---|
| 57-168350 | 10/1982 | Japan. |
| 58-106641 | 6/1983 | Japan. |

OTHER PUBLICATIONS

"Speedup Mechanisms for the Processor," by M. Kuga et al., Collected Reports for the Information Processing Society, 37$^{th}$ National Conference, Sep. 12, 1963, pp. 119–120.

*Primary Examiner*—Larry D. Donaghue
*Attorney, Agent, or Firm*—Price Gess & Ubell

[57] ABSTRACT

A data processor comprises a processing unit which processes an instruction in pipeline stages, the number of which is switchable between n and m, m being a larger number than n. The data processor also comprises a switching unit for switching the number of the pipeline stages of the processing unit between n and m. The switching unit comprises an indicating unit for indicating whether the data processor is in a first operating condition or in a second operating condition, depending either on the frequency of the operation clock provided for the data processor or on the power source voltage supplied to the data processor, and a pipeline control unit for ordering a processing unit to operate in n stages under the first operation condition, and for ordering the processing unit to operate in m stages under the second operating condition.

25 Claims, 17 Drawing Sheets

PRIOR ART

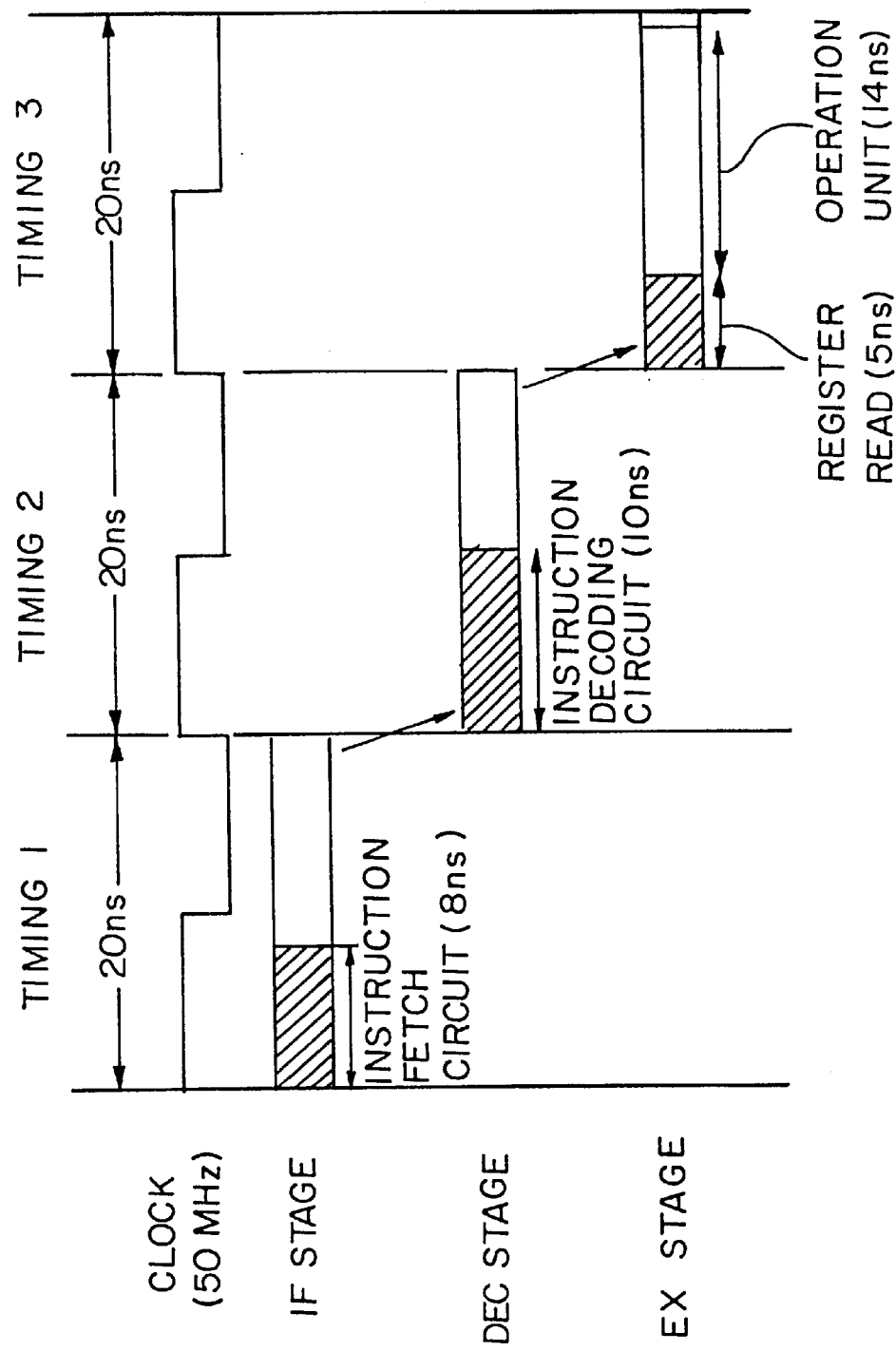

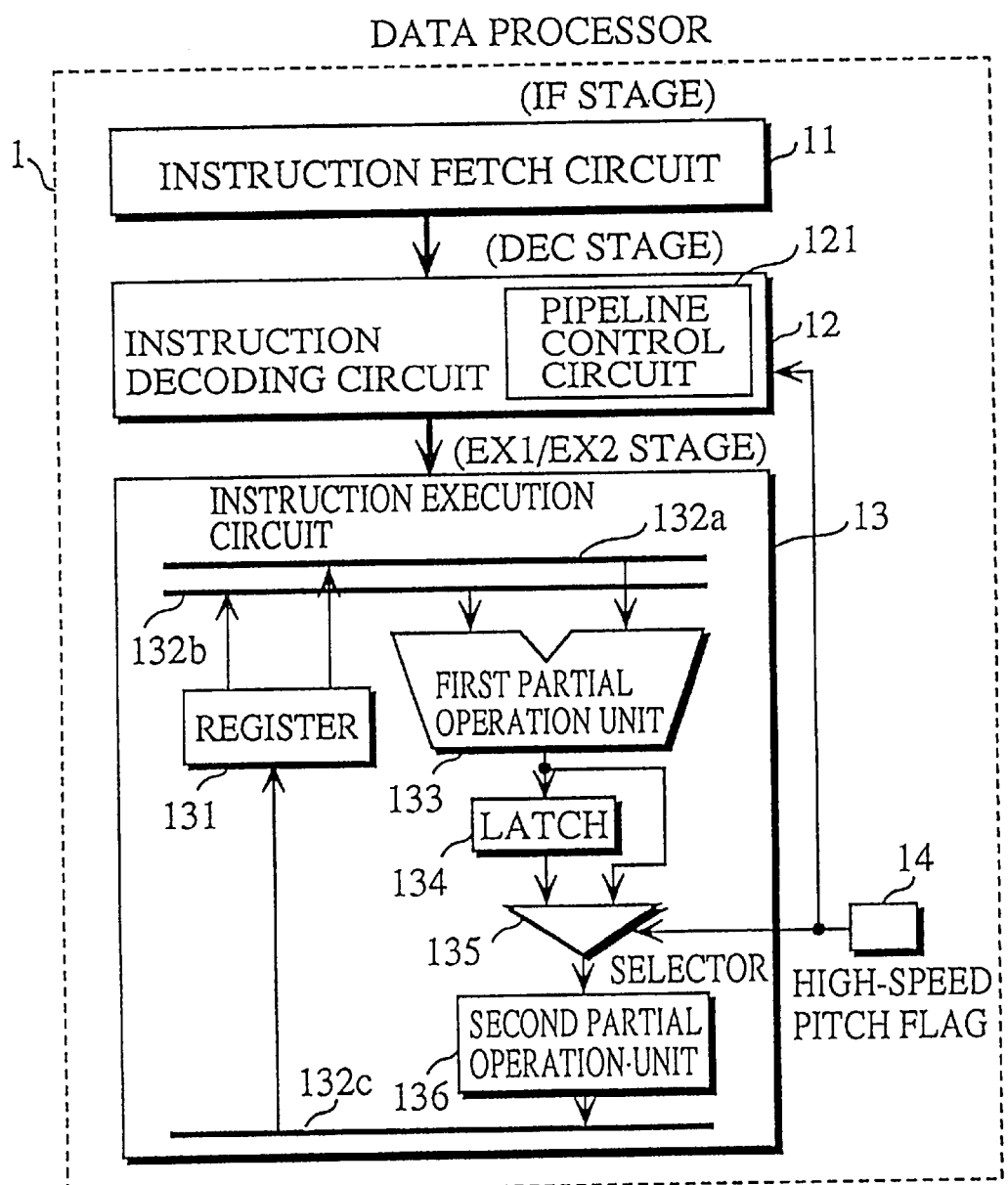

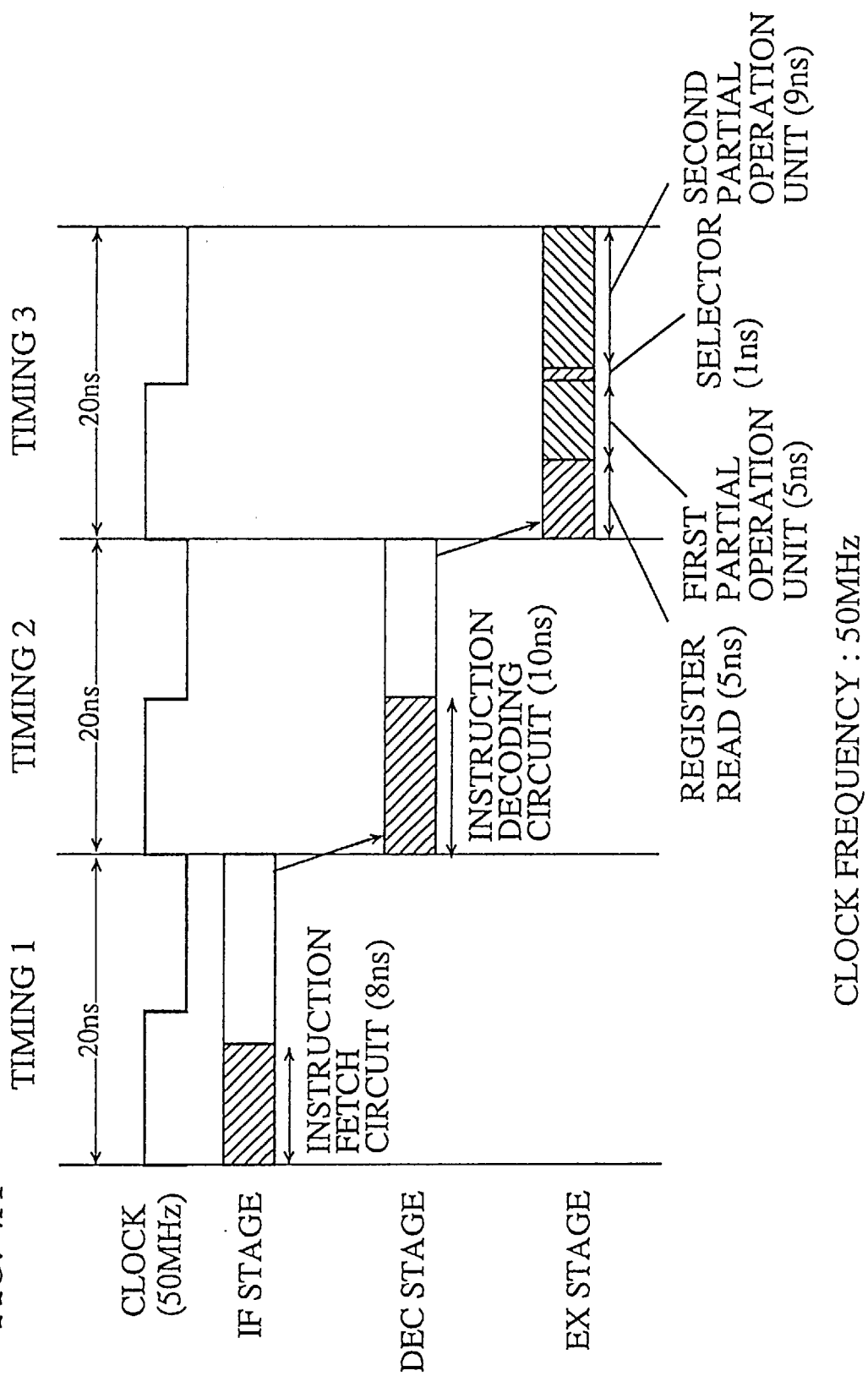

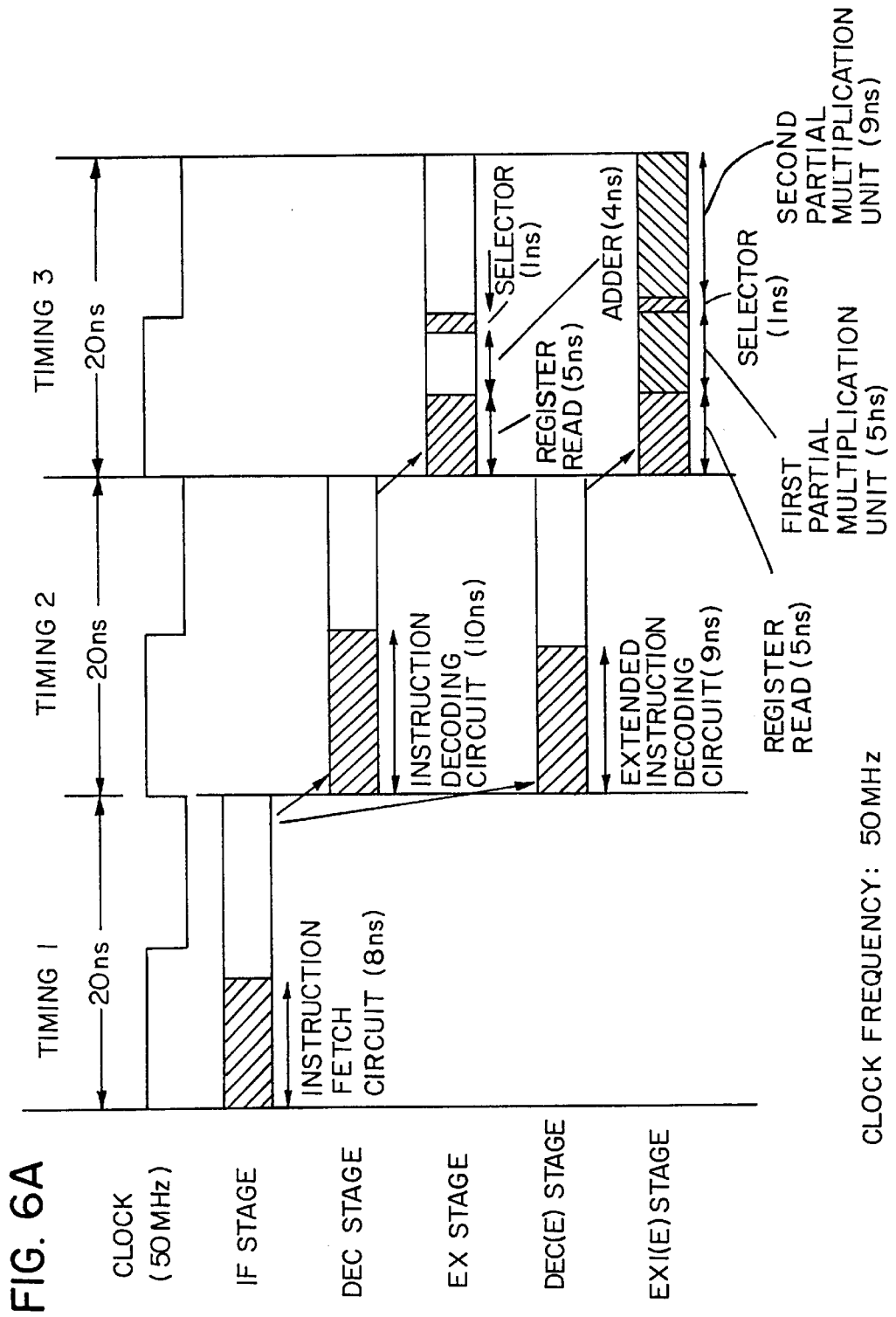

CLOCK FREQUENCY: 100 MHz

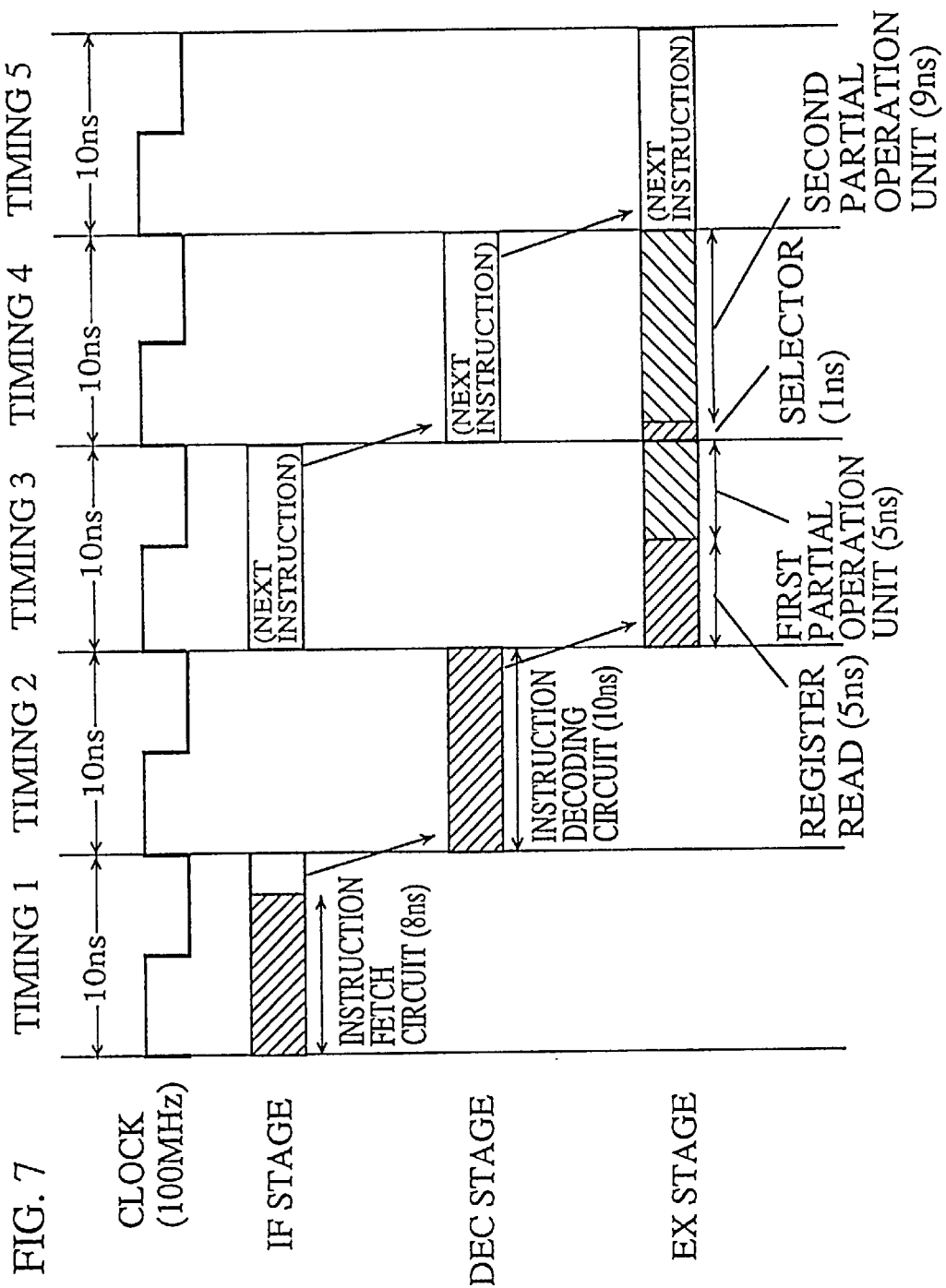

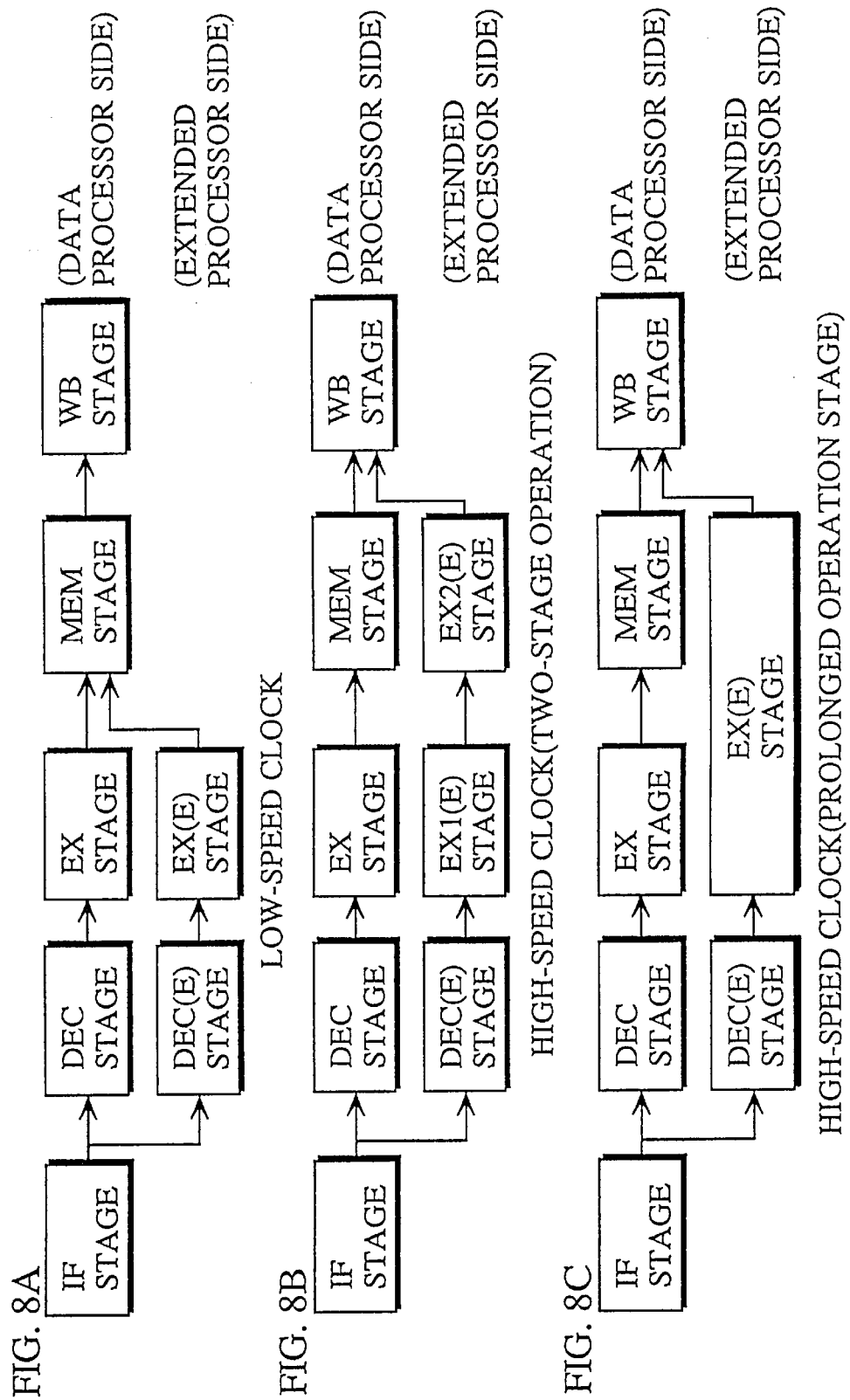

FIG. 10

|  | FIRST OPERATION MODE | | SECOND OPERATION MODE | |
|---|---|---|---|---|
|  | EXTENDED INSTRUCTION | NORMAL INSTRUCTION | EXTENDED INSTRUCTION | NORMAL INSTRUCTION |
| SELECTOR 94 | A | B | — | B |
| SELECTOR 97 | C | B / C | A | B / C |

DATA PROCESSING HAVING A VARIABLE NUMBER OF PIPELINE STAGES

BACKGROUND OF THE INVENTION

1. Field of the Invention

The present invention relates to a data processor which performs pipeline processing in response to an instruction stored in the memory.

2. Related Art

Due to the recent developments in the field of electronics, information processing devices, such as microcomputers, have been widely used in various areas.

Conventional information processing devices can be classified roughly into two types: Complex Instruction Set Computers (CISC) which can execute a large number of instructions of various types, and Reduced Instruction Set Computers (RISC) which limit instructions to certain types, but increase the speed at which the computers executes the instructions. The former includes a TRON specification chip and Motorola's MC68040, while the latter includes Sun Microsystems' SPARC and MIPS Technologies, Inc.'s MIPS. These processors have a pipeline structure to reduce the apparent instruction execution time. With such pipeline structure, the instruction processing is divided into at least three stages: instruction fetching, decoding, and execution. These stages can be performed in parallel.

FIG. 1 is a block diagram of a data processor of a conventional information processing apparatus.

In this figure, a data processor 7 comprises: an instruction fetch circuit 71 for fetching an instruction from a memory (not shown) in an instruction fetch stage (hereinafter referred to as IF stage); an instruction decoding circuit 72 for decoding the instruction fetched by the instruction fetch circuit 71 in an instruction decoding stage (hereinafter referred to as DEC stage); and an instruction execution circuit 73 controlled by the instruction decoding circuit 72 in an instruction execution stage (hereinafter referred to as EX stage). This data processor 7 has a pipeline structure consisting of the above three stages. The instruction execution circuit 73 comprises: a register set 731 for storing the operand data of an operation; buses 732a to 732c for transferring the data read from or to be stored into the register set 731; and an operation unit 733 for executing an operation based on the data transferred by the buses 732a to 732c.

Referring to a timing chart shown in FIG. 2, the following explanation is for an operation in the case where the frequency of the operational clock is 50 MHz (megahertz), i.e., where the processing time of each stage is 20 nanoseconds, in the conventional data processor 7 having the structure described above.

An instruction fetched by the instruction fetch circuit 71 (IF stage: 8 nanoseconds) is decoded by the instruction decoding circuit 72 (DEC stage: 10 nanoseconds), and then executed by the instruction execution circuit 73 (EX stage: 19 nanoseconds). In EX stage, operand data designated by the instruction is read from the register set 731 (5 nanoseconds), inputted into the operation unit 733 via the buses 732a and 732b, calculated by the operation unit 733, and finally sent from the bus 732c to the register set 731 as an operation result (14 nanoseconds). The times shown above are the processing times required in the most time-consuming operations, such as an integer multiplication.

For an information processing apparatus having a pipeline structure, it is necessary to make each stage's processing time uniform and as short as possible. With the conventional information processing apparatus shown in FIG. 1, there is a variation in processing time. The processing time of EX stage is longer than any other processing time, and as a result, the upper limit of the operation clock frequency is low.

As described above, there is a problem in the conventional information processing apparatus in that the upper limit of the clock frequency is determined by the stage of the longest processing time, and such problem prevents an increase of the processing performance. There is another problem that, to make the processing time of EX stage substantially equal to other processing times, an extremely high-speed device and parallel processing are necessary, and as a result, the production cost and power consumption become larger.

The following is a detailed description of those problems with reference to an operation timing chart shown in FIG. 2. Since IF stage and DEC stage are completed in the first half of each machine cycle, these two stages can be performed at 100 MHz. However, the processing time of EX stage is 19 nanoseconds, much longer than either IF stage or DEC stage. As can be seen from the timing chart, the upper limit of the operation clock frequency depends on the processing time of EX stage, and the overall operation can be performed at 50 MHz nearly at the most.

In the case of a RISC-type processor, the processing times of IF stage and DEC stage can shortened by installing a high-speed instruction cache or by simplifying instructions, but at the same time, the processing time of EX stage is prolonged further due to the introduction of a highly functional operation unit. In the case of a CISC processor, DEC stage tends to be prolonged due to complicated variable-length instructions.

Particularly, as various types of data processing are performed by an extended processor so as to accommodate today's multimedia systems, the processing time of EX(E) stage is likely to be prolonged due to the introduction of a highly functional operation unit.

SUMMARY OF THE INVENTION

The object of the present invention is to provide a data processor which is cost-effective and exhibits a good processing ability with either a high-speed clock or a low-speed clock, with the upper limit of the clock frequency being high.

The data processor of the present invention comprises a processing unit which processes an instruction in pipeline stages, the number of which is switchable between n and m, m being a larger number than n, and a switching unit for switching the number of the pipeline stages of the processing unit between n and m.

With this structure, users can freely switch between the n-stage pipeline processing and the m-stage pipeline processing which can be performed at high-speed. More specifically, even if there is a variation in stage processing time in the n-stage pipeline processing, the processing times in the m-stage pipeline processing are almost uniformed so that the upper limit of the operation clock is raised to achieve a high processing performance. If a low-speed clock serves sufficiently for the operation, the n-stage pipeline processing can be performed, because less penalties are caused by branch interlock. In such case, there in no need for high-speed devices or parallel processing, and therefore the power consumption does not increase, which prevents the production cost from rising.

The switching unit may comprise an indicator for indicating whether the operation clock provided for the data processor is a high-speed clock whose frequency exceeds a predetermined frequency or a low-speed clock whose frequency does not exceed the predetermined frequency, and a pipeline control unit which orders the processing unit to perform in n stages when the operation clock is a low-speed clock, and orders the processing unit to perform in m stages when the operation clock is a high-speed clock.

With this structure, users can freely set the number of pipeline stages at n or m depending on the clock frequency, and when high-speed processing is needed, the m-stage pipeline processing is performed.

The switching unit may comprise an indicator for indicating whether the source voltage supplied to the data processor is higher than a predetermined value or not, and a pipeline control unit which orders the processing unit to operate in n stages when the source voltage is higher than the predetermined value, and orders the processing unit to operate in m stages when the source voltage is not higher than the predetermined value.

With the above structure, the number of pipeline stages can be set at either n or m, depending on the source voltage applied. With a low source voltage, high-speed pipeline processing can be performed in m stages.

The processing unit has a pipeline structure comprising at least three-stages: an instruction fetch stage, an instruction decoding stage, and an instruction execution stage.

At least one stage of the instruction fetch stage, the instruction decoding stage, and the instruction execution stage, can be divided into a plurality of partial operation stages.

In the case of the n-stage pipeline processing, the processing unit performs all parts of the operation in one stage, while in the case of the m-stage pipeline processing, it performs each part of the operation separately in each stage.

With this structure, a stage which takes a long processing time can be divided into partial operation stages, which is to say, the processing time which determines the upper limit of the operation clock in the n-stage pipeline processing is divided. Thus, the upper limit of the operation clock frequency in the m-stage pipeline processing can be raised further.

In the data processor, at least one of the processing units comprises a plurality of partial operation units which perform partial operations in the partial operation stages, and a plurality of transmission holding units which are disposed between a partial operation unit and the next partial operation unit, transmit a partial operation result to the next stage in the n-stage pipeline processing, and hold the partial operation result and output it to the next stage in the next machine cycle in the m-stage pipeline processing.

With this structure, a processing unit requiring a long processing time is divided into partial operation units and the transmission holding units, and the upper limit of the operation clock frequency in the m-stage pipeline processing can be raised.

Each of the transmission holding units comprises a pipeline latch for holding the partial operation result of each partial operation unit, and a selector for selecting the partial operation result in the n-stage pipeline processing, and selecting the output of the pipeline latch and transmitting it to the next partial operation unit in the m-stage pipeline processing. With this structure, a plurality of partial operation units are pipelined by such a simple circuit comprising a pipeline latch and a selector.

The processing unit comprises: an instruction fetch unit for fetching an instruction in the instruction fetch stage; an instruction decoding unit for decoding the fetched instruction in the instruction decoding stage; and an instruction execution unit which executes an instruction in one stage in one machine cycle in a first operation mode, and executes a part of an instruction in one stage and the rest of it in the next stage in a second operation mode.

The pipeline control unit in such case orders the instruction execution unit to operate in the first operation mode when the frequency of the operation clock is not higher than a predetermined frequency, and to operate in the second operation mode when the frequency of the operation clock is higher than the predetermined one. With this structure, the upper limit of the operation clock frequency of RISC-type data processor can be raised, because the instruction execution stage which generally takes a long processing time is divided into partial operation stages.

The instruction execution unit comprises: a first partial operation unit for executing a part of an instruction decoded by the instruction decoding unit; a pipeline latch for latching the operation result of the first partial operation unit; a selector for selecting either the operation results of the first partial operation unit or the output of the pipeline latch; and a second partial operation unit for executing the remaining part of the instruction according to the output of the selector.

The pipeline control unit in this case orders the selector to select the operation results of the first partial operation unit so that the instruction execution unit operates in one stage in the first operation mode, while it orders the selector to select the output of the pipeline latch so that the instruction execution unit operates in the second mode and that both the first partial operation unit and the second partial operation unit operate in one stage.

With this structure, the upper limit of the operation clock frequency of the data processor can be raised, because the instruction execution unit is divided into two partial operation units.

The data processor may further comprise an extended processor which processes extended operation instructions, which have been read by the data processing unit. The extended processor processes an extended operation instruction in pipeline stages, the number of which is switchable between K and L, L being a larger number than K, and comprises: an extended instruction processing unit for processing an extended operation instruction in pipeline stages; and an extended pipeline control unit for changing the number of pipeline stages of the extended processing unit.

With this structure, a high-speed data processor can be obtained as well as a high-speed extended processor.

The extended processing unit comprises: an extended instruction execution unit for executing an extended operation instruction either in one machine cycle or in two machine cycles; and an extended pipeline control unit for switching the extended instruction execution unit between a one-cycle operation mode and a two-cycle operation mode using the switching unit. With this structure, the extended instruction execution unit, which requires a long processing time to execute a complicated extended operation instruction, can be divided into several stages.

The data processor of the present invention may comprise: a first processing unit which includes a register and reads a first-type instruction from a memory to perform pipeline processing; a second processing unit which pipelines a second-type instruction read by the first processing unit in a plurality of stages, the number of which is switchable between K and L, L being a larger number than K; and a switching unit for switching the number of the pipeline stages of the second processing unit between K and L. If the second processing unit performs K-stage pipeline processing, the first processing unit obtains the operation result of the second processing unit in a predetermined stage, and if the second processing unit performs L-stage pipeline processing, the first processing unit obtains the operation result of the second processing unit in a stage that is L-minus-K stages later than the predetermined stage, and stores the operation result into the register.

The first processing unit has a pipeline structure comprising a first stage, a second stage, a third stage, a fourth stage, and a fifth stage, and includes: an instruction fetch unit for fetching an instruction from a memory in the first stage; a first decoding unit which decodes a first-type instruction fetched by the instruction fetch unit, and also detects a memory address designated by a second-type instruction in the second stage; a first execution unit for executing the first-type instruction decoded by the first decoding unit in the third stage; and a data control unit which accesses the memory according to the detection result of the first decoding unit in the fourth stage, and stores the execution result into the register in the fifth stage.

The second processing unit comprises: a second decoding unit for decoding a second-type instruction fetched by the instruction fetch unit in the second stage; and a second execution unit which executes an instruction in the third stage in the first operation mode, and executes a part of an instruction in the third stage and the remaining part of it in the fourth stage in the second operation mode.

The data control unit in this case may store the execution result of the second execution unit into the register in the fifth stage.

In the data processor comprising the first processing unit as a main processor and the second processing unit as a coprocessor, a second-type instruction is fetched from the memory by the first processing unit, the fetched instruction is executed by the second processing unit, and the execution result is stored into the register by the first processing unit. The number of the pipeline stages of the first processing unit is fixed, while the number of the pipeline stages later than the instruction fetch stage of the second processing unit can be changed.

The second processing unit may be able to prolong one stage among the K stages, instead of switching the number of stages between K and L. With this structure having a prolonged stage in the second processing unit, the upper limit of the operation clock frequency can be raised.

BRIEF DESCRIPTION OF THE DRAWINGS

These and other objects, advantages and features of the invention will become apparent from the following description thereof taken in conjunction with the accompanying drawings which illustrate specific embodiments of the invention. In the drawings:

FIG. 2 is a timing chart of the operation of the data processor of the prior art.

FIG. 3 is a block diagram showing the structure of a data processing in the first embodiment of the present invention.

FIGS. 4A and 4B are timing charts of the operation of the data processor in the first embodiment of the present invention.

FIGS. 6A and 6B are timing charts of the operation of the information processing apparatus in the second embodiment.

FIG. 7 is a timing chart of the operation of the information processing apparatus in another embodiment of the present invention.

FIGS. 8A to 8C shows pipeline structures of the information processing apparatus in yet another embodiment of the present invention.

FIG. 10 shows the control logic of the pipeline control circuit in the third embodiment.

DESCRIPTION OF THE PREFERRED EMBODIMENTS

Figure 1:
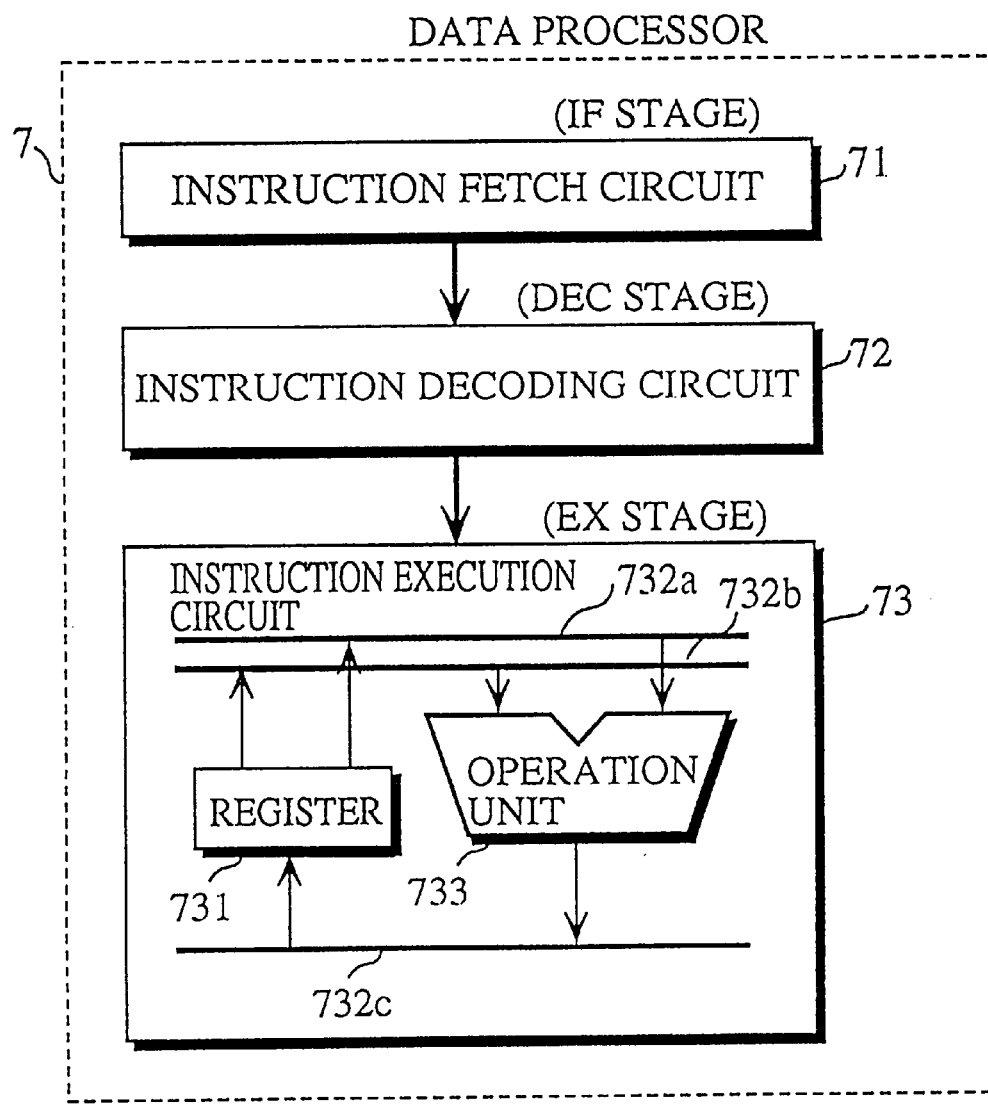
FIG. 1 is a block diagram showing the structure of a data processor of the prior art.

The following is an explanation of the embodiments of the present invention, with reference to FIGS. 3 to 15.

First Embodiment

FIG. 3 is a block diagram showing the structure of the data processor of the first embodiment of the present invention.

The data processor has either a three-stage pipeline structure consisting of an instruction fetch stage (hereinafter referred to as IF stage), an instruction decoding stage (hereinafter referred to as DEC stage), and an instruction execution stage (hereinafter referred to as EX stage), or a four-stage pipeline structure consisting of IF stage, DEC stage, and a first instruction execution stage and a second instruction execution stage (hereinafter referred to as EX1 stage and EX2 stage, respectively).

In FIG. 3, the data processor 1 comprises an instruction fetch circuit 11, an instruction decoding circuit 12, an instruction execution circuit 13, and a high-speed pitch flag 14. The number of the pipeline stages is three or four.

The instruction fetch circuit 11 operates in IF stage and fetches an instruction from an internal memory (not shown) or an external memory (not shown).

The instruction decoding circuit 12 operates in DEC stage and decodes the instruction fetched by the instruction fetch circuit 11. The instruction decoding circuit 12 includes a pipeline control circuit 121 which controls the pipeline processing and the number of the pipeline stages. When the high-speed flag is on, the pipeline control circuit 121 orders the instruction execution circuit 13 to operate in two stages, and when the flag 14 is off, the pipeline control circuit 121 activates the instruction execution circuit 13 in one stage. By doing so, either the four-stage pipeline processing or the three-stage pipeline processing can be selectively controlled depending on the status of the high-speed pitch flag 14.

The instruction execution circuit 13 comprises: a register set 131 for storing the operand of an operation; buses 132a to 132c for holding the data fetched from the register set 131 or to be stored into the register set 131; a first partial operation unit 133 which executes the former part of the operation using the data transferred from the buses 132a and 132b; a latch 134 for holding the result of the first partial operation unit 133; a selector 135 which selects the output of the latch 134 when the high-speed pitch flag 14 is on, and selects the result of the first partial operation unit 133 when the flag has been cleared; and a second partial operation unit 136 for receiving the output of the selector 135 and executing the latter part of the operation. With this structure, the instruction execution circuit 13 executes one operation in two stages (EX1 stage and EX2 stage) in the case where the high-speed pitch flag 14 is on, and it executes one operation in one stage (EX stage) in the case where the high-speed pitch flag 14 is off.

Figure 4B:
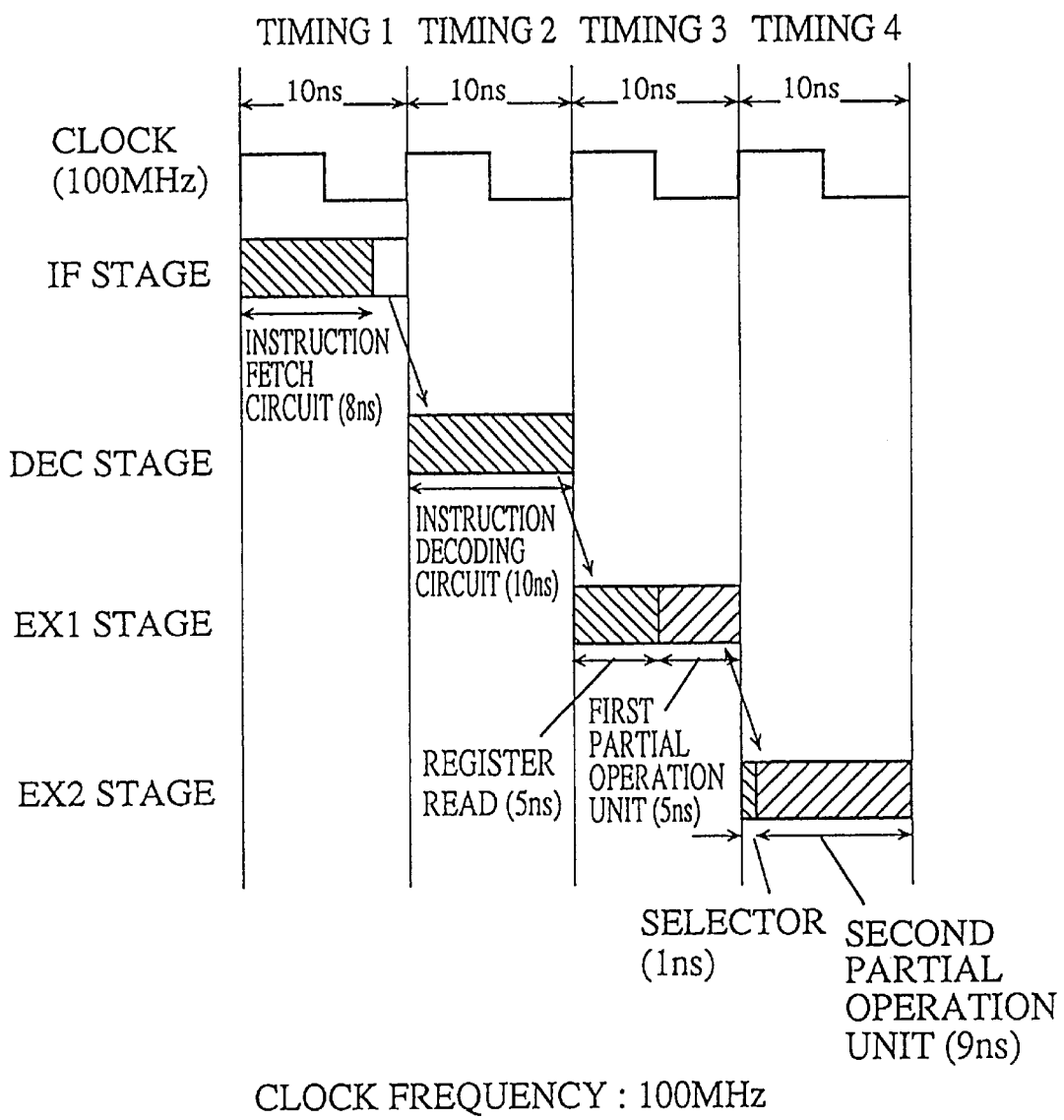

The high-speed pitch flag 14 holds a flag which shows whether the operation clock supplied to the data processor 1 is a high-speed clock or a low-speed clock. In this embodiment, the flag is set if the frequency of the operation clock is higher than 50 MHz, and the flag is cleared if the frequency of the operation clock is 50 MHz or lower. As shown in FIGS. 4A and 4B, the processing times of the instruction fetch circuit 11, the instruction decoding circuit 12, the readout of the register set 131, the first partial operation unit 133, the selector 135, and the second partial operation unit 136, are set at 8 nanoseconds, 10 nanoseconds, 5 nanoseconds, 5 nanosecond, 1 nanosecond, and 9 nanosecond, respectively. The other processing times can be ignored. To make the comparison easier, the total processing time of the first partial operation unit 133 and the second partial operation unit 136 is 14 nanoseconds, and the other processing times are substantially the same as in the prior art.

The following explanation is for the operation of the data processor of the first embodiment of the present invention having the structure described above. This explanation is divided into two sections: one of which is for the case where the clock frequency is low, and the other is for the case where the clock frequency is high.

(1) If the Clock Frequency is 50 MHz or Lower (Low Speed)

FIG. 4A shows a timing chart in the case where the data processor operates with a clock frequency of 50 MHz, i.e., with a machine cycle of 20 nanoseconds. Here, the high-speed pitch flag is off. The instruction execution circuit 13 operates only in EX stage. FIG. 4A shows each processing period of IF stage, DEC stage, and EX stage, in each machine cycle.

(Timing 1) The instruction fetch circuit 11 fetches an instruction (processing time: 8 nanoseconds).

(Timing 2) The instruction decoding circuit 12 decodes the fetched instruction (processing time: 10 nanoseconds).

(Timing 3) As the high-speed pitch flag 14 is off, the instruction execution circuit 13 is controlled by the pipeline control unit 121 so that EX stage is performed in one machine cycle. The operands designated by the instruction are read from the register set 131 and sent via the buses 132a and 132b to the first partial operation unit 133, which performs the former part of the operation. The selector 135 selects the result of the first partial operation unit 133 and outputs it to the second partial operation unit 136. The latter part of the operation is performed within the same machine cycle. The result of it is sent to the register set 131 via the bus 132c, where the operation is terminated (total processing time: 20 nanoseconds).

(2) If the Clock Frequency Is in the Range of 51 MHz to 100 MHz (High Speed)

FIG. 4B shows a timing chart in the case where the data processor operates with a clock frequency of 100 MHz, i.e., with a machine cycle of 10 nanoseconds. In this figure, each processing time of IF stage, DEC stage, EX1 stage, and EX2 stage is shown for each machine cycle.

(Timing 1) The instruction fetch circuit 11 fetches an instruction (processing time: 8 nanoseconds).

(Timing 2) The instruction decoding circuit 12 decodes the fetched instruction (processing time: 10 nanoseconds).

(Timing 3) As the high-speed pitch flag 14 is off, the instruction execution circuit 13 is controlled by the pipeline control unit 121 so that EX1 stage and EX stage are performed in two machine cycles. The instruction is executed in the following manner.

The operand designated by the instruction is read from the register set 131 and sent to the first partial operation unit 133 via buses 132a and 132b. The former part of the operation is performed there and the result is held by the latch 134. The latch 134 serves as a pipeline latch, and terminates EX1 stage (total processing time: 10 nanoseconds).

(Timing 4) The processing result of EX1 stage is outputted from the latch 134 via the selector 135, and the second partial operation unit 136 performs the latter part of the operation. The operation result is sent to the register set 131 via the bus 132c, where the operation comes to an end (total processing time: 10 nanoseconds).

According to the first embodiment of the present invention, the operation of the instruction execution circuit 13, which requires a long processing time, can be divided into two stages EX1 and EX2 by setting the high-speed pitch flag 14, and the processing time of each stage of the pipeline can be almost uniform and less than 10 nanoseconds. Thus, the frequency of the operation clock ranges from 51 MHz to 100 MHz, making the processing performance higher.

If the clock frequency is lower than 50 MHz, the pipeline structure has three stages, because the instruction execution circuit 13 operates in one EX stage in spite of the processing time prolonged by the fact that the high-speed pitch flag 14 is off. In such case, branch interlocks can be made fewer than in a four-stage pipeline, and therefore, upon execution of a branch instruction, fewer instructions are flushed and fewer cycles are interlocked.

Second Embodiment

Figure 5:
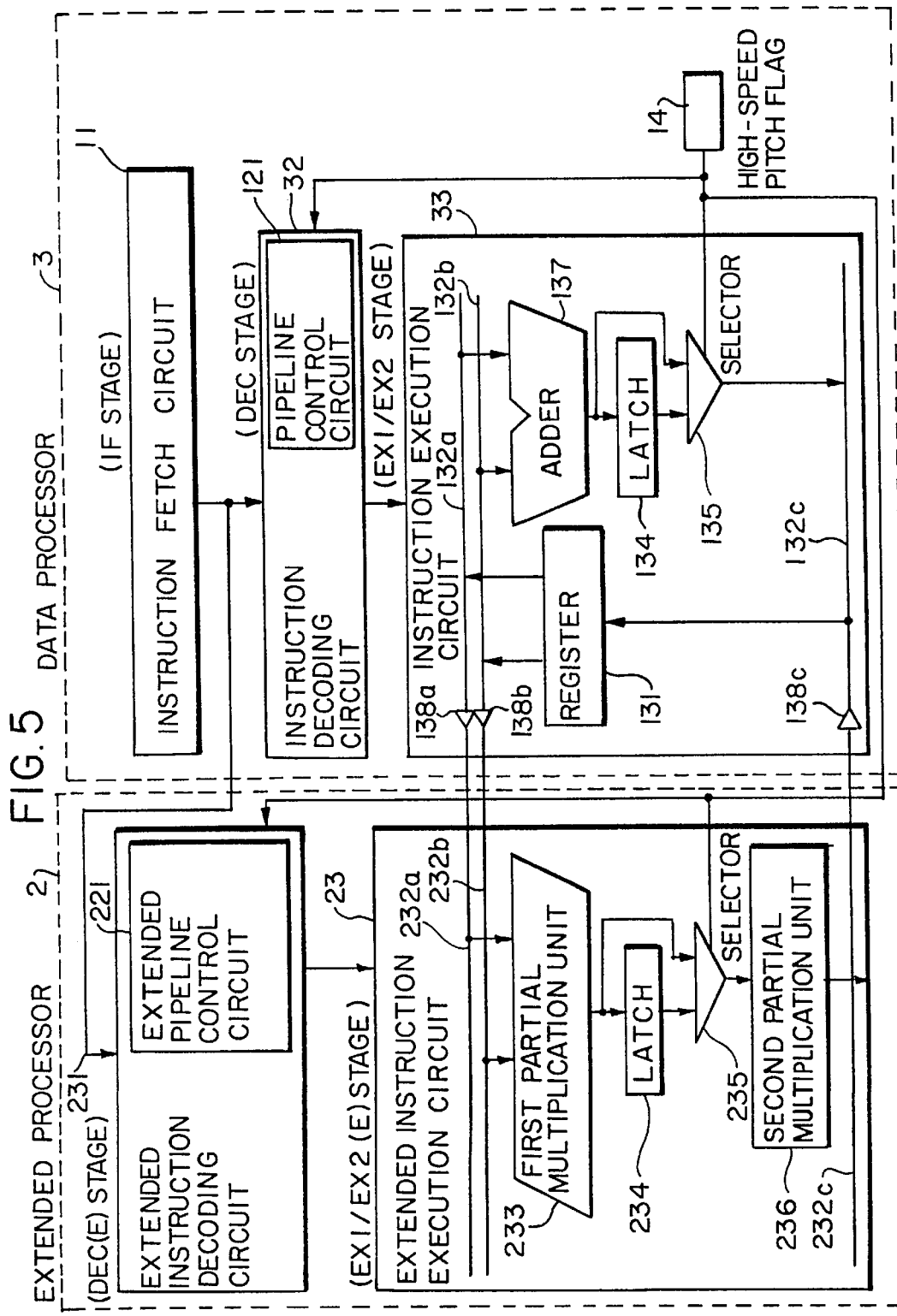
FIG. 5 is a block diagram showing the structure of the information processing apparatus consisting of a main data processor and an extended processor in the second embodiment.

FIG. 5 is a block diagram showing the structure of an information processing apparatus consisting of a data processor and an extended processor of the second embodiment of the present invention.

This information processing apparatus comprises a data processor 3 and an extended processor 2. In this figure, the same components as in the data processor 1 are denoted by the same reference numerals, and explanations are omitted for these common components. The following explanation is mainly for the different features.

The data processor 3 is the same as the data processor 1 in that either three-stage pipeline processing or four-stage pipeline processing is selected depending on the statue of the high-speed pitch flag 14. The data processor 3 is different from the data processor 1 in that it comprises an instruction decoding circuit 32 and an instruction execution circuit 33 instead of the instruction decoding circuit 12 and the instruction execution circuit 13, and that it is connected to the extended processor 2 by means of buses 232a, 232b, and 232c. Another different aspect of the data processor 3 is that there are two types of instructions fetched by the instruction fetch circuit 11: one is an instruction for the data processor 3 (hereinafter referred to as normal instruction), and the other is an extended operation instruction for the extended processor 2.

The instruction decoding circuit 32 has the same functions as the instruction decoding circuit 12. In addition to that, the instruction decoding circuit 32 decodes an extended operation instruction, reads the data designated by the operand from the register set 131, supply the operand data to the extended processor 2, receives the extended operation result from the extended processor 2, and writes it into the register set 131.

This instruction execution circuit 33 is different from the instruction execution circuit 13 in that it is provided with buffers 138a to 138c, and that the adder is not pipelined. The instruction execution circuit 33 does not only operate like the instruction execution circuit 13, but also sends data read from the register set 131 to buffers 138a and 138b via the buses 132a and 132b, outputs the data from the buffers 138a and 138b to the extended processor 2, and writes the data into the register set 131 via the buffer 138c. The adder 137 has the functions of the first partial operation unit 133 and the second partial operation unit 136.

An instruction bus 231 transmits an instruction fetched by the instruction fetch circuit 11 to both the instruction decoding circuit 32 and the extended instruction decoding circuit 22 simultaneously.

The bus 232c transmits operation result data from the extended processor 2 to the data processor 3.

The extended processor 2 comprises the extended instruction decoding circuit 22 and the extended instruction execution circuit 23, and it is provided with the same operation clock as the data processor 3. Depending on the status of the high-speed pitch flag 14, the extended processor 2 performs either three-stage pipeline processing which consists of IF stage, an extended instruction decoding stage (hereinafter referred to as DEC(E) stage), and an extended instruction execution stage (hereinafter referred to as EX(E) stage), or four-stage pipeline processing which consists of IF stage, DEC(E) stage, a first extended instruction execution stage (hereinafter referred to as EX1(E) stage), and a second extended instruction execution stage (hereinafter referred to as EX2(E) stage). The stages DEC(E), EX(E), EX1(E), and EX2(E) are performed in place of the stages DEC, EX, EX1, and EX2 of the data processor 3.

The extended instruction decoding circuit 22 decodes an extended operation instruction fetched by the instruction fetch circuit 11 in DEC(E) stage. If the high-speed pitch flag 14 is on, an extended pipeline control circuit 221 inside the extended instruction decoding circuit 22 orders the extended instruction execution circuit 23 to operate in EX1(E) stage and EX2(E) stage, and if the high-speed pitch flag 14 is off, the extended pipeline control circuit 221 orders the extended instruction execution circuit 23 to operate only in EX(E) stage. Thus, depending on the status of the high-speed pitch flag 14, either the four-stage pipeline processing or the three-stage pipeline processing is selectively controlled.

The extended instruction execution circuit 23 comprises: buses 232a and 232c which are connected to the buffers 138a to 138c; a first partial multiplication unit 233 which functions as the former part of a multiplication unit for performing multiplication based the data transmitted via the buses 232a to 232c; a latch 234 for holding the result of the first partial multiplication unit 233; a selector 235 which selects the output of the latch 234 if the high-speed pitch flag 14 is on, and which selects the result of the first partial multiplication unit 233 if the high-speed pitch flag is off; and a second partial multiplication unit 236 which receives the output of the selector 235 and performs the latter part of the multiplication.

Figure 6B:
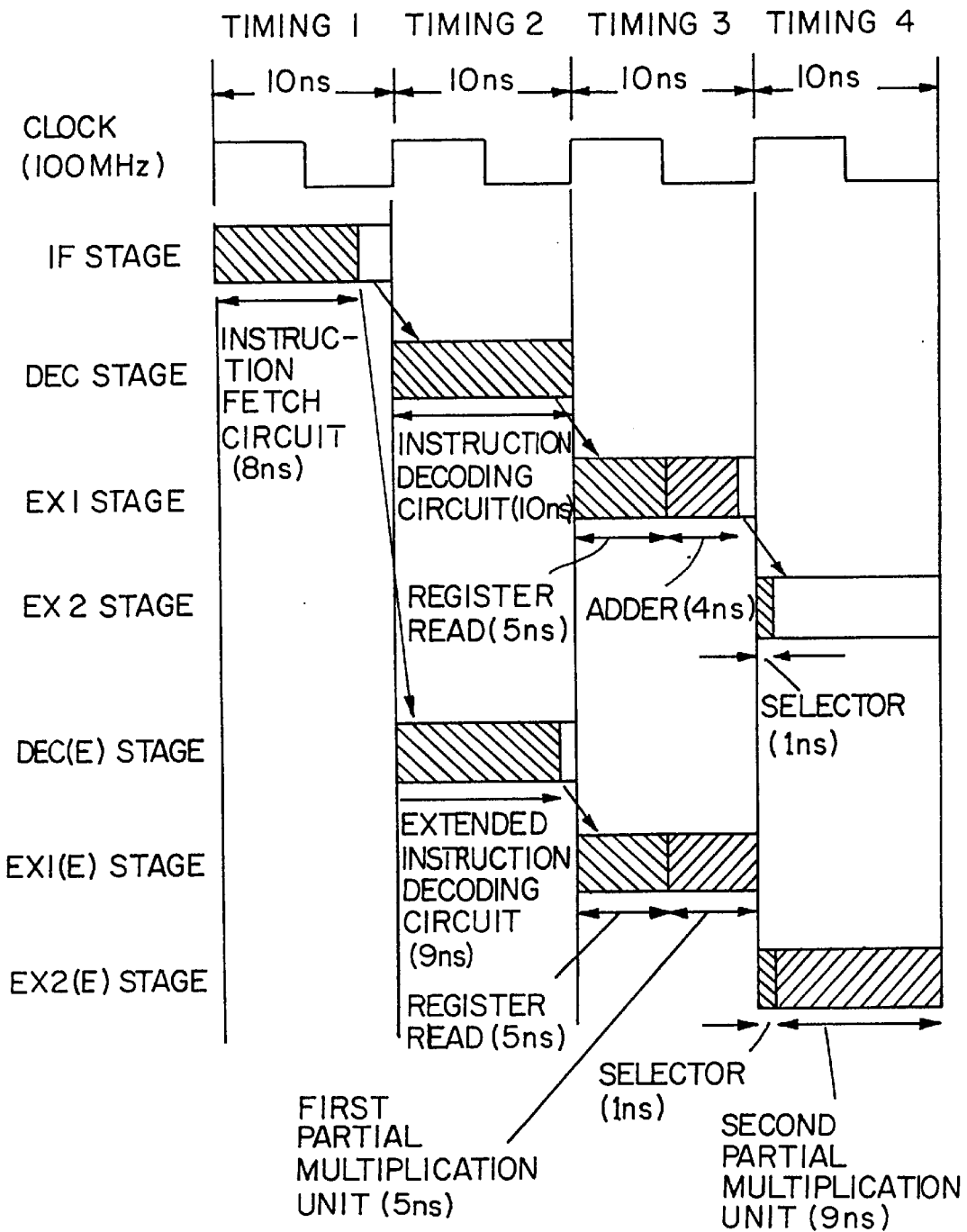

As shown in FIGS. 6A and 6B, the processing times of the instruction fetch circuit 11, the instruction decoding circuit 32, the readout of the register set 131, the adder 137, the selector 135, the extended instruction decoding circuit 22, the first partial multiplication unit 233, the selector 235, and the second partial multiplication unit 236, are set at 8 nanoseconds, 10 nanoseconds, 5 nanoseconds, 4 nanoseconds, 1 nanoseconds, 9 nanoseconds, 5 nanoseconds, 1 nanoseconds, and 9 nanoseconds, respectively. Other processing times can be ignored. To make the comparison easier, the total processing time of the first partial multiplication unit 233 and the second partial multiplication unit 236 is 14 nanoseconds, and the other processing times are the same as in the prior art.

The following explanation is for the operation of the data processor of the second embodiment of the present invention having the structure described above. This explanation is divided into two sections: one of which is for the case where the clock frequency is low, and the other is for the case where the clock frequency is high.

(1) If the Clock Frequency is Low (50 MHz or Lower)

FIG. 6A shows an example operation in which the clock frequency is 50 MHz, i.e., the machine cycle is 20 nanosecond. Here, the high-speed pitch flag 14 is off. The instruction execution circuit 33 operates only in EX stage, and the extended instruction execution circuit 23 operates only in EX(E) stage. FIG. 6A shows each processing period of IF stage, DEC stage, EX stage, DEC(E) stage, and EX(E) stage, in each machine cycle.

(Timing 1) The instruction fetch circuit 11 fetches an instruction (processing time: 8 nanoseconds).

(Timing 2) The instruction decoding circuit 32 and the extended instruction decoding circuit 22 decode the fetched instruction (processing time: 10 nanoseconds and 9 nanoseconds, respectively).

(Timing 3) If the instruction has been judged to be a normal instruction to be processed by the data processor 3 from the decoding results of the instruction decoding circuit 32 and the extended instruction decoding circuit 22, the instruction execution circuit 33 executes the instruction, and if the instruction has been judged to be an extended instruction to be processed by the extended processor 2, the extended instruction execution circuit 23 executes the instruction. The following is a detailed description of the execution of an instruction.

In the case of an add instruction, the operands designated by the instruction are read from the register set 131, and sent to the adder 137 via the buses 132a and 132b. The result of the adder 137 is held by the latch 134. As the high-speed pitch flag 14 is off, the selector 135 selects the result of the adder 137, and the output of the selector 135 is sent to the register set 131 via the bus 132c (total processing time: 10 nanoseconds).

In the case of a multiply instruction, the operands designated by the instruction are read from the register set 131, and sent from the buses 132a and 132b to the buses 232a and 232b via the buffers 138a and 138b. The first partial multiplication unit 233 performs the former part of a multiplication, the result of which is held by the latch 234. Since the high-speed pitch flag 14 is off, the selector 235 selects the result of the first partial multiplication unit 235, and the second partial multiplication unit 236 then performs the latter part of the multiplication. The result is transmitted from the bus 232c to the bus 132c via the buffer 138c, and then stored into the register set 131, where the operation comes to an end (total processing time: 20 nanoseconds).

(2) If the Clock Frequency is High (in the Range of 51 MHz to 100 MHz)

FIG. 6B shows an example operation in which the clock frequency is 100 MHz, i.e., the machine cycle is 10 nanoseconds. Here, the high-speed pitch flag 14 is on. The instruction execution circuit 33 operates in both EX1 stage and EX2 stage, while the extended instruction execution circuit 23 operates in both EX1(E) stage and EX2(E) stage. FIG. 6B shows each processing period of IF stage, DEC stage, DEC(E) stage, EX1 stage, EX1(E) stage, EX2 stage, and EX2(E) stage, in each machine cycle.

(Timing 1) The instruction fetch circuit 11 fetches an instruction (processing time: 8 nanoseconds).

(Timing 2) The instruction decoding circuit 32 and the extended instruction decoding circuit 22 decode the fetched instruction (processing time: 10 nanoseconds and 9 nanoseconds, respectively).

(Timing 3) If the instruction has been judged to be processed only by the data processor 3 from the decoding result of the instruction decoding circuit 32 and the extended instruction decoding circuit 22, the instruction execution circuit 33 executes the instruction. If the instruction has been judged to be processed by the extended processor 2, the extended instruction execution circuit 23 executes the instruction. The following is a detailed description of the execution of an instruction.

In the case of an add instruction, the operands designated by the instruction are read from the register set 131, and sent to the adder 137 via the buses 132a and 132b. The result from the adder 137 is held by the latch 134. The latch 134 functions as a pipeline latch of EX1 stage (total processing time: 9 nanoseconds).

In the case of a multiply instruction, the operands designated by the instruction are read from the register set 131, and sent from the buses 132a and 132b to the buses 232a and 232b via the buffers 138a and 138b. The first partial multiplication unit 233 performs the former part of a multiplication, the result of which is held by the latch 234. The latch 234 functions as a pipeline latch of EX1(E) stage (total processing time: 10 nanoseconds).

(Timing 4) Successively, the instruction execution circuit 33 and the extended instruction execution circuit 23 operate in EX2 stage and EX2(E) stage, respectively.

In the case of an add instruction, the selector 135 selects the output of the latch 134, and the output of the selector 135 is transmitted to the register set 131 via the bus 132c (processing time: 1 nanosecond).

In the case of a multiply instruction, the selector 235 selects the output of the latch 234, and the second partial multiplication unit 236 performs the latter part of the multiplication. The result of the multiplication is transmitted to the bus 132c via the buffer 138c, the stored into the register set 131, where the operation comes to an end (processing time: 10 nanoseconds).

As described so far, in the second embodiment of the present invention, if the clock frequency is higher than 50 MHz, the high-speed pitch flag 14 is set to divide the pipeline stage of the extended instruction execution circuit 23, which requires a long processing time, into two stages, so that the processing time of each stage of the pipeline becomes almost uniform and less than 10 nanoseconds. If the clock frequency is 50 MHz or lower, the extended instruction execution circuit 23 is capable of operating in one stage which is longer than the others. So, the high-speed pitch flag 14 is cleared to shorten the pipeline structure to three stages, and to make the pipeline stall time shorter than the pipeline stall time in four-stage pipeline processing at the time of branching. Thus, penalties caused by the branch interlock can be reduced.

In the first embodiment of the present invention, when the clock frequency exceeds 50 MHz, the high-speed pitch flag 14 is set, and the pipeline stages of the instruction execution circuit 13 is divided into EX1 stage and EX2 stage so that the processing time of the instruction execution circuit 13 can be divided. As shown in the operation timing chart of FIG. 7, however, even if the clock frequency exceeds 50 MHz, the instruction execution circuit 13 may operate only in EX1 stage. In such case, the execution stage may be prolonged to two machine cycles, and the processing time of the instruction execution circuit 13 is divided into timing 3 and timing 4. Thus, the operation can be performed at a frequency of up to 100 MHz as in the first embodiment shown in FIG. 4B. When the clock frequency does not exceed 50 MHz, the penalties caused by branch interlock can be reduced. The next instruction which comes after the instruction executed in two machine cycles, however, is decoded in timing 4 and executed in timing 5 or later, as shown in FIG. 7.

In the second embodiment of the present invention, too, when the clock frequency exceeds 50 MHz, the extended instruction execution circuit 23 operates only in EX1(E) stage, which may be prolonged to two machine cycles.

In the second embodiment of the present invention, the information processing apparatus has a three-stage pipeline structure, and the execution stage, which comes last in the operation, may be divided into two stages, depending on the clock frequency. The information processing apparatus may have any of the pipeline structures shown in FIGS. 8A to 8C. Each data processor of FIGS. 8A to 8C has a five-stage pipeline structure consisting of an instruction fetch stage (IF stage), an instruction decoding stage (DEC stage), an execution stage (EX stage), a memory access stage (MEM stage), and a write back stage (WB stage). Each main data processor is independent of the clock frequency. Meanwhile, each extended processor has a pipeline structure consisting of an extended decoding stage (DEC(E) stage) and an extended execution stage (EX(E) stage). The following is a description of the operation of the latter stage, which depends on the clock frequency.

In the case where the clock frequency is low and the extended execution stage is capable of operating in a single machine cycle, the extended processor has the pipeline structure as shown in FIG. 8A. In other words, an instruction which requires extended processing is executed in EX(E) stage by the extended processor in a single machine cycle, and then sent back to the data processor in MEM stage and later.

If the clock frequency is high and the extended execution stage cannot be performed in a single machine cycle, an instruction is processed as shown in FIG. 8B or 8C. In FIG. 8B, an instruction which requires extended processing is executed in EX1(E) stage and EX2(E) stage by the extended processor, and sent back to the data processor in WB stage. In FIG. 8C, an instruction which requires extended processing is executed in prolonged EX(E) stage by the extended processor, and sent back to the data processor in WB stage.

With either of the structures shown in FIGS. 8B and 8C, the pipeline processing time of each stage is almost uniform and short, and the upper limit of the clock frequency is not lowered by the addition of the extended processor. If the clock frequency is low, the processing results of the extended processor are sent back to the data processor in MEM stage. Thus, the pipeline suspension time is shorter than in the case where the extended processing results are sent back in WB stage, and penalties caused by resource conflict interlock can be reduced.

Third Embodiment

The following is a detailed description of an information processing apparatus which switches the pipeline structure between FIGS. 8A and 8B.

Figure 9:
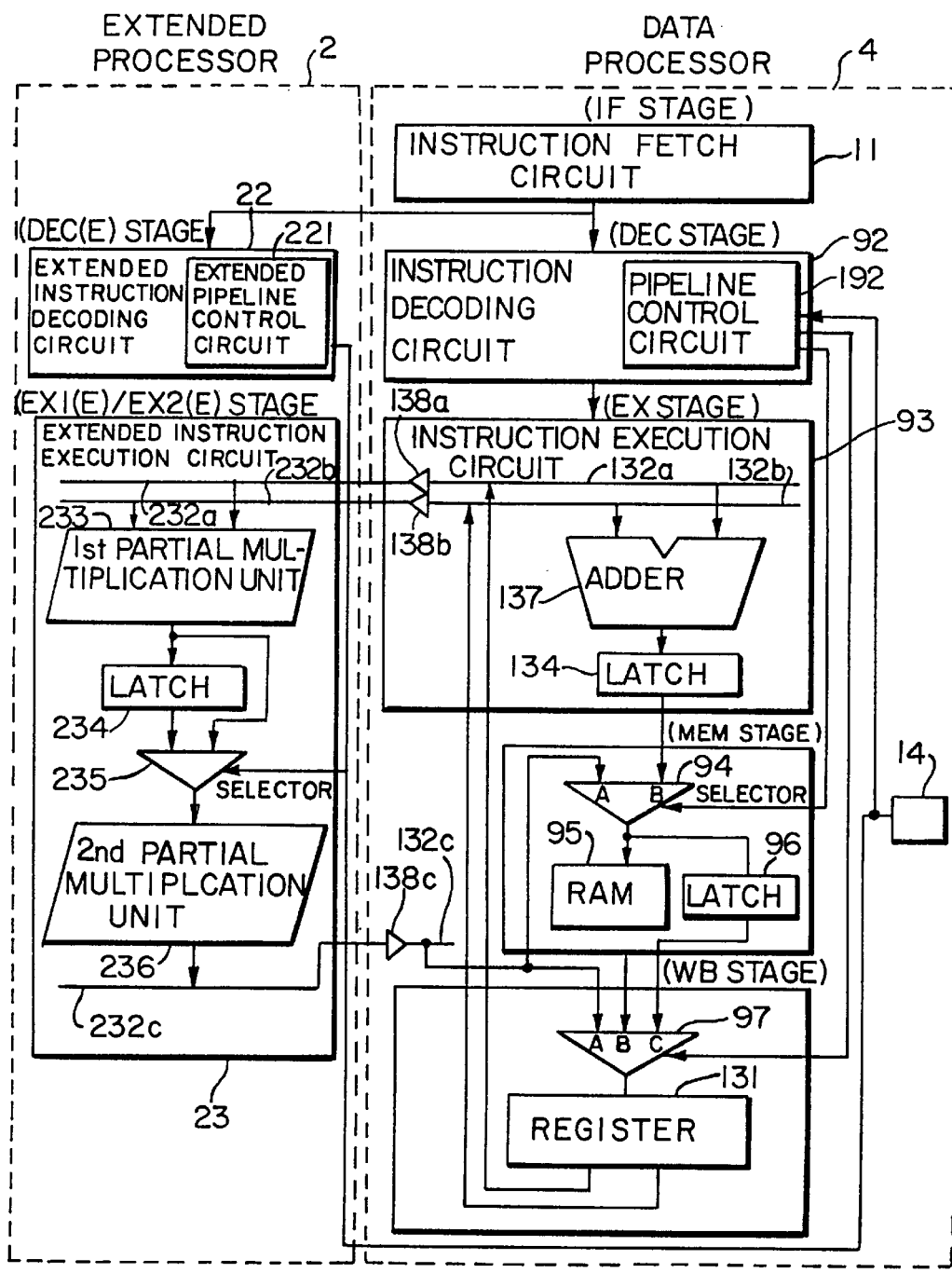
FIG. 9 is a block diagram showing the structure of a data processor and an extended processor in the third embodiment.

FIG. 9 is a block diagram showing the structure of a data processor and an extended processor of the third embodiment of the present invention. In this figure, the components common to the second and third embodiment are denoted by the same reference numerals as in FIG. 5, and explanations of those components are not included in the following description.

This embodiment is different from the second embodiment shown in FIG. 5 in that a data processor 4 is provided in place of the data processor 3. The data processor 4 has a fixed pipeline structure (five stages), regardless of the status of the high-speed pitch flag 14, as shown in FIGS. 8A and 8B.

The data processor 4 comprises components which the data processor 3 does not include. Those components are an instruction decoding circuit 92 (including a pipeline control circuit 192), an adder 137, a selector 94, a RAM 95, a latch 96, and a selector 97. The five-stage pipeline structure consists of IF stage, DEC stage, EX stage, MEM stage, and WB stage.

The instruction decoding circuit 92 decodes a normal instruction to be processed by the data processor 4, and also decodes an extended operation instruction to be processed by the extended processor 2. The data designated by the operand of the instruction is read from the register set 131, and supplied to the extended processor 2. The extended operation result obtained from the operand data is then sent from the extended processor 2 back to the data processor 4, and stored into the register set 131. The data processor 4 may also receive the extended operation result in either MEM stage or WB stage.

The selector 94 functions under the control of the pipeline control circuit 192 in MEM stage. It selects the contents of the pipeline latch 134 (input B in FIG. 9) of the previous stage upon execution of a normal instruction, while it selects the extended operation result of the extended processor 2 (input A in FIG. 9) upon execution of an extended operation instruction.

The selector 97 functions under the control of the pipeline control circuit 192 in WB stage. It selects either the output of the RAM 95 (input B in FIG. 9) or the contents of the pipeline latch 96 (input C in FIG. 9) upon execution of a normal instruction, while it selects the extended operation result of the extended processor 2 (input A in FIG. 9) upon execution of an extended operation instruction.

The pipeline control circuit 192 decides, depending on the status of the high-speed pitch flag 14, whether the extended operation result should be inputted in MEM stage or in WB stage. More specifically, if the high-speed pitch flag 14 is off, the result of an extended operation carried out by the extended processor 2 in EX(E) stage is inputted in MEM stage as shown in FIG. 8A, and written back into the register set 131 in WB stage. If the high-speed pitch flag 14 is on, the result of an extended operation carried out by the extended processor 2 in EX1(E) stage and EX2(E) stage is inputted in WB stage as shown in FIG. 8B, and also written back into the register set 131 in WB stage.

FIG. 10 shows how the pipeline control circuit 192 controls the selectors 94 and 97. In this figure, a first operation mode specifies that the high-speed pitch flag 14 is off, in other words, the extended processor 2 executes an extended operation instruction in EX(E) stage as shown in FIG. 8A. A second operation mode specifies that the high-speed pitch flag 14 is on, in other words, the extended processor 2 executes an extended operation instruction in EX1(E) stage and EX2(E) stage as shown in FIG. 8B. Each of the alphabetic characters A, B, and C indicates the input to be selected by the selectors 94 and 97 in FIG. 9.

According to this control system, when executing an extended instruction in the first operation mode, the extended operation result of the extended instruction execution circuit 23 is latched by the pipeline latch 96 through the selector 94 (input select A) in MEM stage, and written back into the register set 131 through the selector 97 (input select C) in WB stage. When executing an extended instruction in the second operation mode, the extended operation result of the extended instruction execution circuit 23 is written back into the register set 131 through the selector 97 (input select A) in WB stage.

When executing a normal instruction, the operation is the same in either of the operation modes. More specifically, the operation result of the instruction execution circuit 93 is written into the RAM 95 through the selector 94 (input select B), or latched by the pipeline latch 95 in MEM stage. The operation result is then written into the register set 131 through the selector 97 (input select B or C) in WB stage. Here, the input B of the selector 97 is written back if, for instance, a load instruction to transfer the data of the RAM 95 to the register set 131 is executed. The input C of the selector 97 is written back if the operation result of the instruction execution circuit 93 is written back into the register set 131 instead of into the RAM 95.

The following is an explanation of the information processing apparatus of the third embodiment of the present invention having the structure described above. This explanation is divided into two sections: one of which is for the case where the clock frequency is low, and the other is for the case where the clock frequency is high.

(1) If the Clock Frequency is 50 MHz or Lower (Low Speed)

Figure 11:
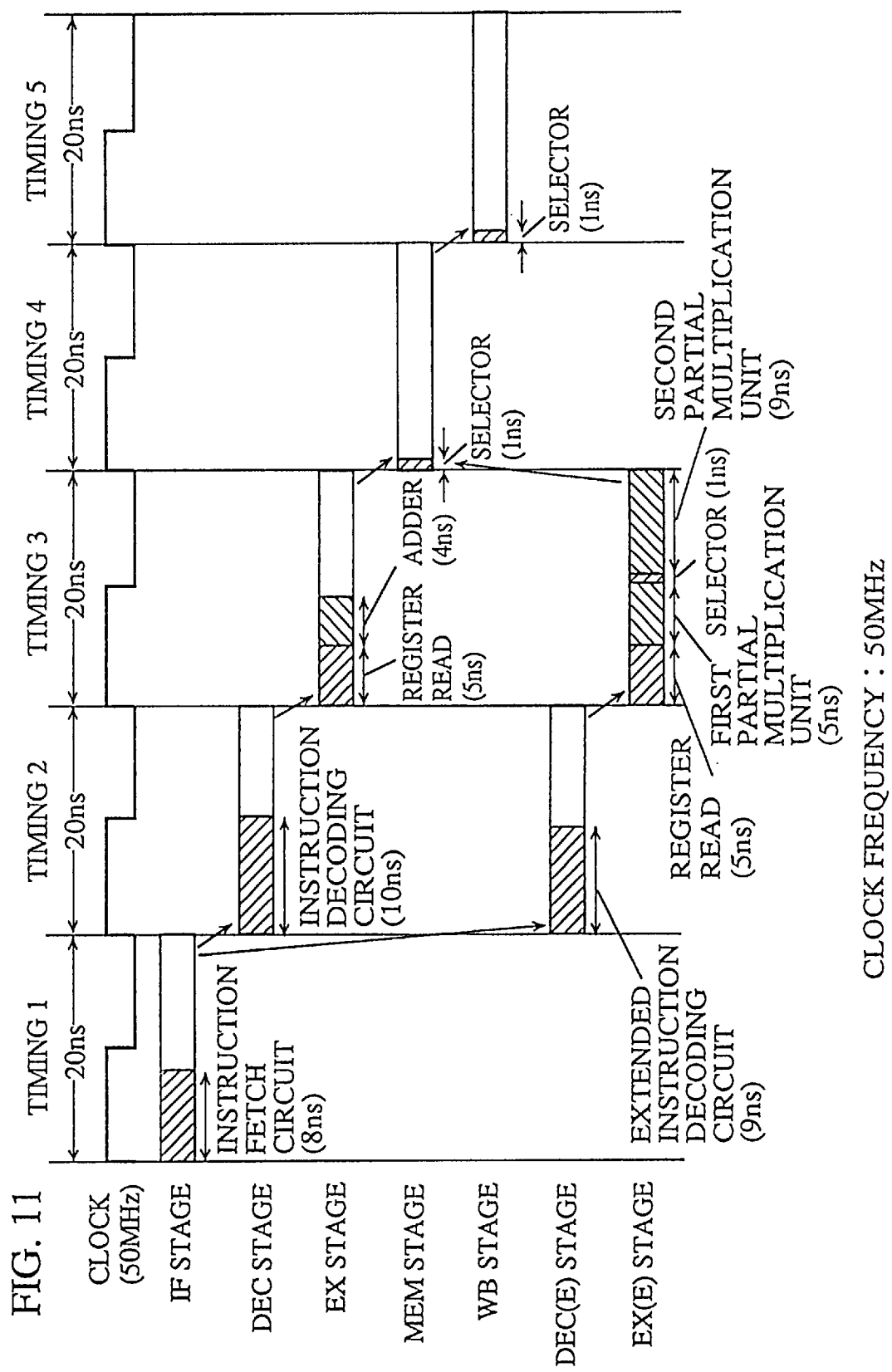
FIG. 11 is a timing chart showing the low-speed operation in the third embodiment.

FIG. 11 is a timing chart showing the operation timing in the case where the high-speed pitch flag 14 is off. This figure corresponds to FIG. 8A.

(Timing 1) The instruction fetch circuit 11 fetches an instruction (processing time: 8 nanoseconds).

(Timing 2) The instruction decoding circuit 92 and the extended instruction decoding circuit 22 decode the fetched instruction (processing time: 10 nanoseconds and 9 nanoseconds, respectively).

(Timing 3) If the fetched instruction has been judged to be a normal instruction to be processed only by the data processor 4 from the decoding results of the instruction decoding circuit 92 and the extended instruction decoding circuit 22, the instruction execution circuit 93 executes the instruction, and if the fetched instruction has been judged to be an extended operation instruction to be processed by the extended processor 2, the extended instruction execution circuit 23 executes the instruction.

In the case of a normal instruction (an add instruction), the operands designated by the instruction are read from the register set 131, and sent to the adder 137 via the buses 132a and 132b. The result of the adder 137 is held by the latch 134 (total processing time: 9 nanoseconds).

In the case of an extended operation instruction (a multiply instruction), the operands designated by the instruction are read from the register set 131, and transmitted from the buses 132a and 132b to the buses 232a and 232a via the buffers 138a and 138b. The first partial multiplication unit 233 performs the former part of a multiplication, the result of which is held by the latch 234. Since the high-speed pitch flag 14 is off, the selector 235 selects the result of the first partial multiplication unit 233, and the second partial multiplication unit 236 then performs the latter part of the multiplication (total processing time: 20 nanoseconds). (Timing 4) In the case of an add instruction, the addition result held by the latch 134 is transferred and latched by the latch 96 through the selector 94 (input select B) (processing time: 1 nanosecond).

In the case of a multiply instruction, the operation result of the second partial multiplication unit 236 is transmitted from the bus 232c to the bus 132c via the buffer 138c, and then latched by the latch 96 through the selector 94 (input select A) in the data processor 4 (processing time: 1 nanosecond). (Timing 5) The operation result of the latch 96 is stored into the register set 131 (processing time: 5 nanoseconds) through the selector 97 (input select C).

(2) If the Clock Frequency Is in the Range of 51 MHz to 100 MHz (High Speed)

Figure 12:
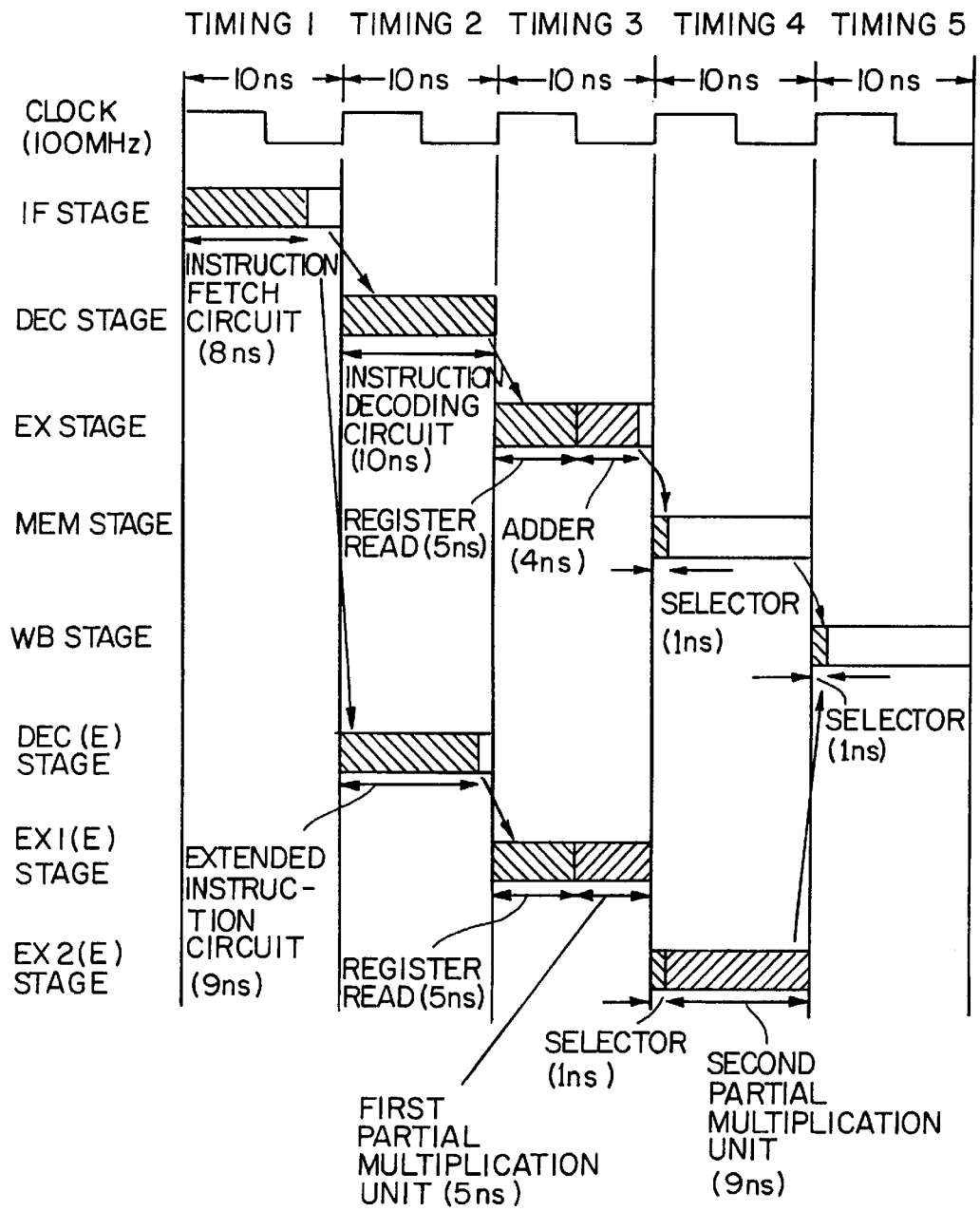
FIG. 12 is a timing chart showing the high-speed operation in the third embodiment.

FIG. 12 is a timing chart showing the operation timing in the case where the high-speed pitch flag 14 is on. This figure corresponds to FIG. 8B. (Timing 1) and (Timing 2) are the same as in FIG. 11. (Timing 3) If the fetched instruction has been judged to be a normal instruction to be processed only by the data processor 3 from the decoding results of the instruction decoding circuit 92 and the extended instruction decoding circuit 22, the instruction execution circuit 93 executes the instruction, and if the fetched instruction has been judged to be an extended operation instruction to be processed by the extended processor 2, the extended instruction execution circuit 23 executes the instruction.

In the case of a normal instruction (an add instruction), the operands designated by the instruction are read from the register set 131, and sent to the adder 137 via the buses 132a and 132b. The result of the adder 137 is held by the latch 134 (total processing time: 9 nanoseconds).

In the case of an extended operation instruction (a multiply instruction), the operands designated by the instruction are read from the register set 131, and transmitted from the buses 132a and 132b to the buses 232a and 232b via the buffers 138a and 138b. The first partial multiplication unit 233 performs the former part of a multiplication, the result of which is held by the latch 234 (total processing time: 10 nanoseconds). (Timing 4) In the case of an add instruction, the addition result held by the latch 134 is transferred and latched by the latch 96 through the selector 94 (input select B) (processing time: 1 nanosecond).

In the case of a multiply instruction, since the high-speed latch flag 14 has been set, the selector 235 selects the first-half multiplication result held by the latch 234, and the second partial multiplication unit 236 then performs the latter part of the multiplication (total processing time: 10 nanoseconds. (Timing 5) In the case of an add instruction, the data held by the latch 96 is transferred and stored into the register set 131 through the selector 97 (input select C) (processing time: 1 nanosecond).

In the case of a multiply instruction, the operation result of the second partial multiplication unit 236 is transmitted from the bus 232c to the bus 132c via the buffer 138c, and then stored into the register set 131 through the selector 97 (input select A) (processing time: 1 nanosecond) in the data processor 4.

As described so far, in this embodiment, the number of the pipeline stages of the data processor is fixed, while the number of the processing stages in the extended processor are variable.

[Fourth Embodiment]

The following is a detailed description of an information processing apparatus which switches from one of the pipeline structures of FIGS. 8A and 8C to another.

Figure 13:
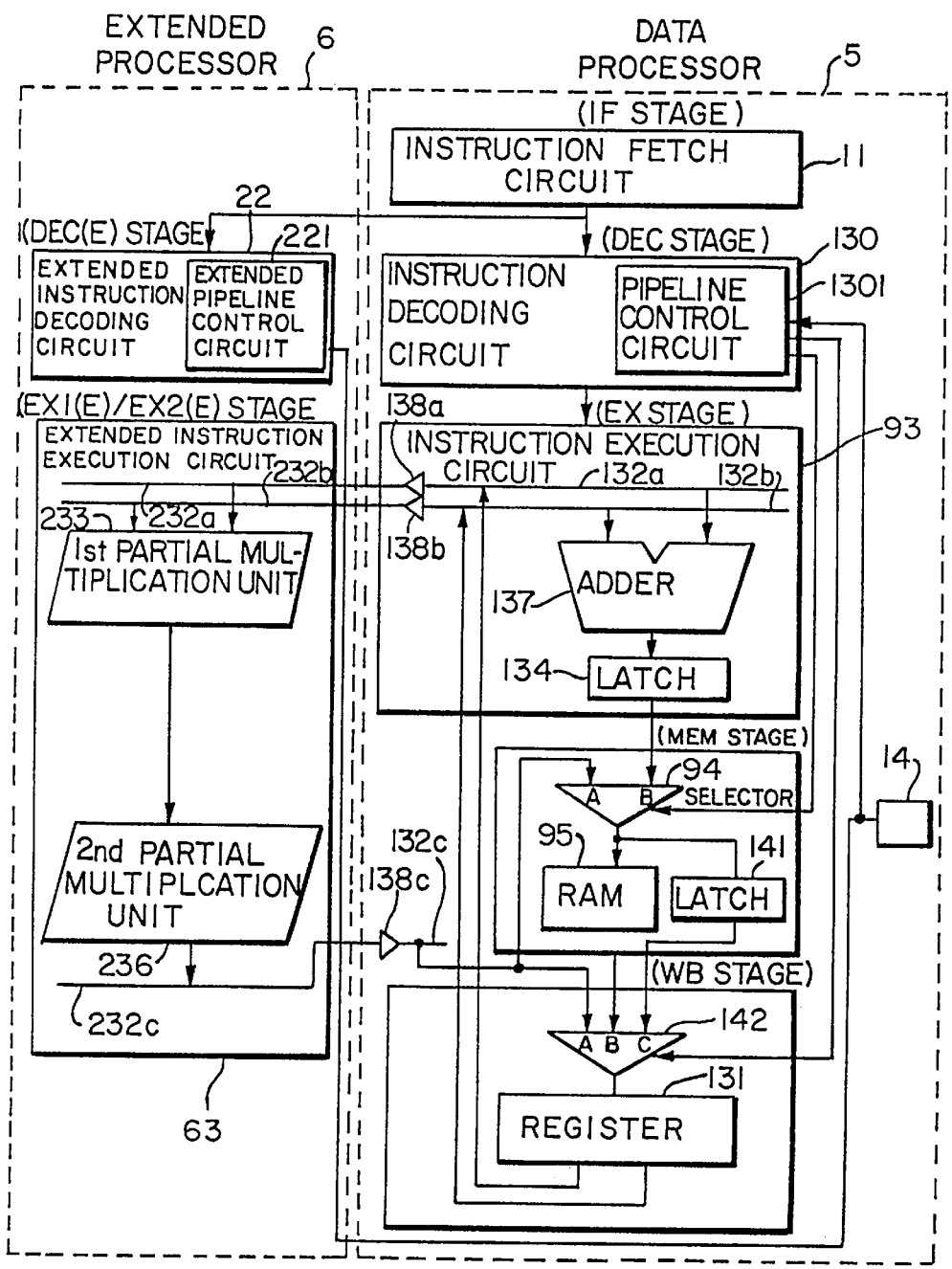
FIG. 13 is a block diagram showing the structure of a data processor and an extended processor in the fourth embodiment.

FIG. 13 is a block diagram showing the structure of a data processor and an extended processor of the fourth embodiment. In this figure, the components included in the third embodiment are denoted by the same reference numerals as in FIG. 9, and the explanation of those components are omitted in the following description, which focuses on the features of this embodiment.

FIG. 13 is different from FIG. 9 in that the latch 234 and the selector 235 are excluded from the extended processor, and that an instruction decoding circuit 130 is provided in place of the instruction decoding circuit 92. The extended instruction execution circuit 63 does not include a latch and latch 141 and selector 142 have different reference numbers, but perform the same functions.

The reason why the latch 234 and the selector 235 are excluded from the extended processor is that a pipeline latch is unnecessary in prolonging the extended execution stage (EX(E) stage). As shown in FIGS. 8A and 8C, the extended instruction execution circuit executes an extended operation instruction in one machine cycle or in two machine cycles. In the case of the two machine cycle execution, a pipeline latch is unnecessary. As a result, when EX(E) stage is performed in one machine cycle, the throughput of the extended processor 6 is one instruction per one machine cycle. When EX(E) stage is performed in two machine cycles (FIG. 8C), the throughput of the extended processor 6 is one instruction per two machine cycles.

In addition to the function of the instruction decoding circuit 92 shown in FIG. 9, the instruction decoding circuit 130 serves to control the pipeline flow so that an extended operation instruction is executed in two machine cycles if the high-speed pitch flag 14 is on. The pipeline control circuit 1301 is the same as the pipeline control circuit 192 shown in FIG. 9, and controls the selectors 94 and 97 in the control logic shown in FIG. 10.

The following explanation is for the operation of the information processing apparatus of the third embodiment of the present invention, in both cases of a low-speed clock and a high-speed clock.

Figure 14:
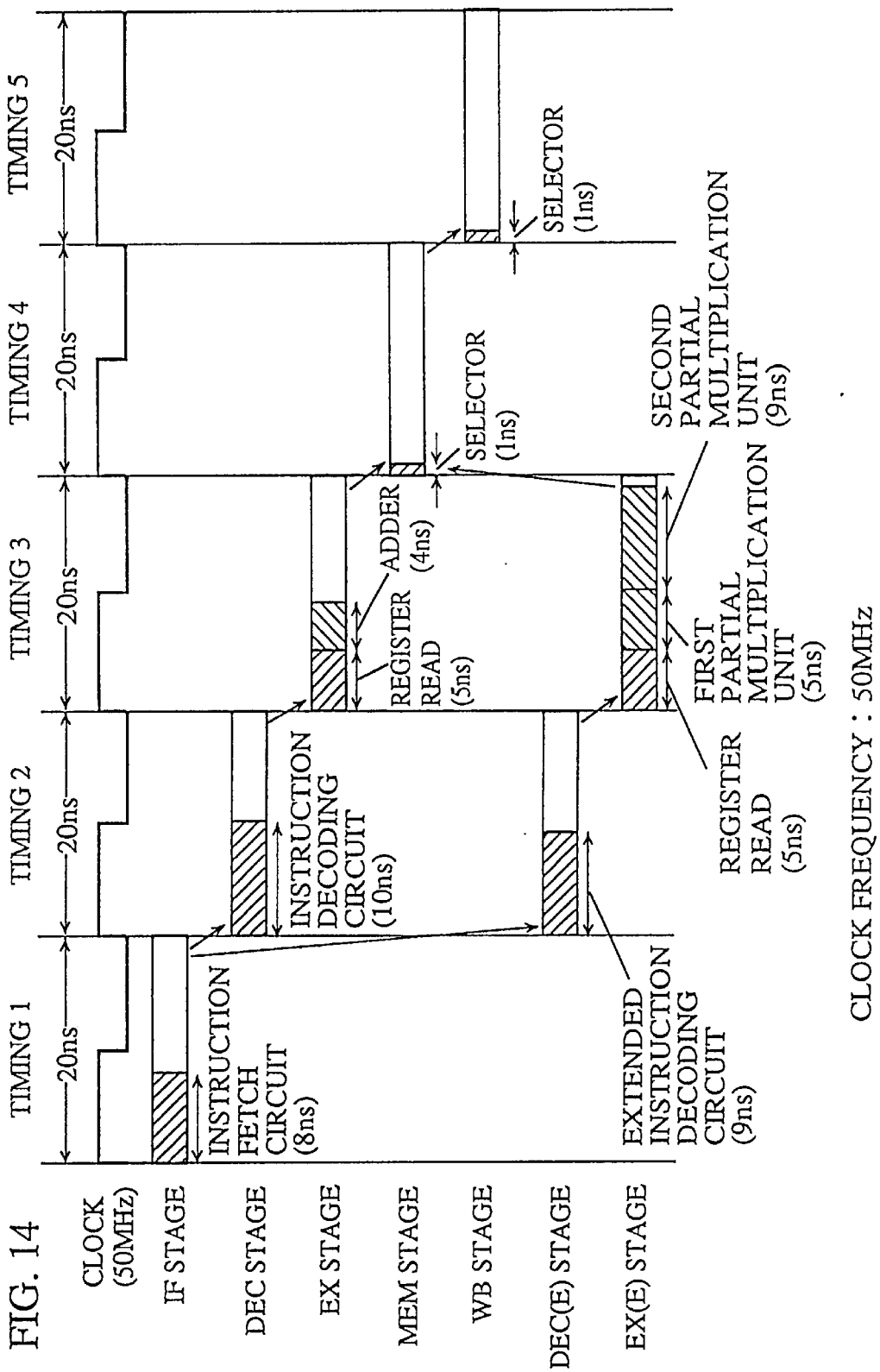
FIG. 14 is a timing chart showing the low-speed operation in the fourth embodiment.

FIG. 14 is a timing chart showing the operation timing in the case where the high-speed pitch flag 14 is off. This figure corresponds to FIG. 8A, and shows the same operation as in the third embodiment depicted in FIG. 11. The only difference is that no delay is caused by the selector 235 in Timing 3. So, the processing time in the Timing 3 is 19 nanoseconds.

Figure 15:
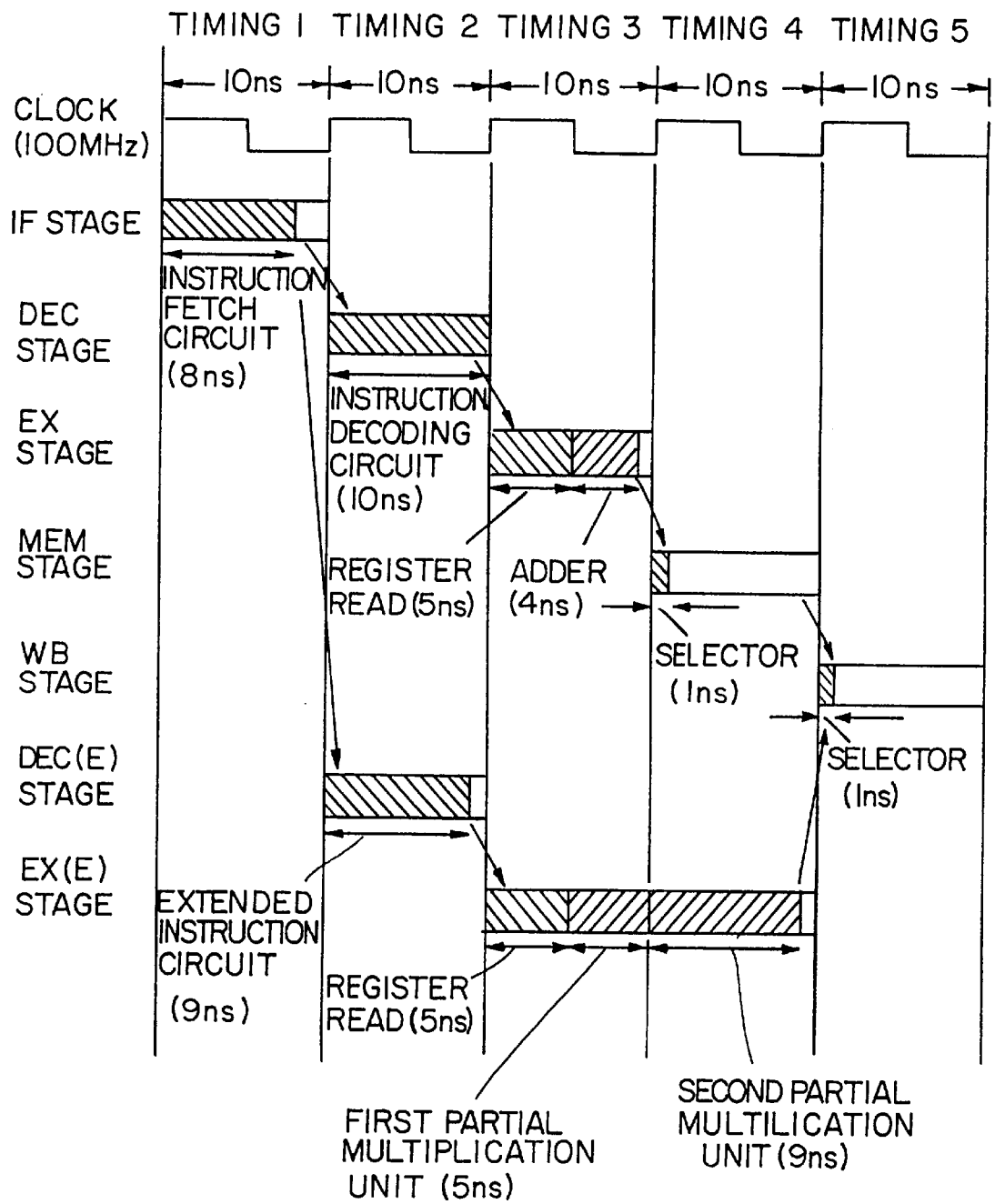
FIG. 15 is a timing chart showing the high-speed operation in the fourth embodiment.

FIG. 15 is a timing chart showing the operation timing in the case where the high-speed pitch flag 14 is on. This figure corresponds to FIG. 8C, and shows the same operation as in the third embodiment depicted in FIG. 12. The difference is that the extended processor 6 requires two machine cycles to perform one extended execution stage (EX(E) stage), and that no delay is caused by the selector 235 in Timing 4. So, the processing time in Timing 4 is 9 nanoseconds.

As described above, in the data processor and the extended processor of this embodiment, the number of pipeline stages of the data processor is fixed, and the extended execution stage of the extended processor can be prolonged, as shown in FIGS. 8A and 8C. If the extended execution stage is prolonged, one extended operation instruction is executed in two machine cycles, as shown in FIG. 8C. Comparing FIG. 14 with FIG. 15, even if the extended execution stage of the extended processor is prolonged, the execution of an extended operation instruction cannot be speeded up, but the clock frequency can become higher so that the execution of a normal instruction can be speeded up. As the number of extended operation instructions contained in the program is far smaller than the number of normal instructions, the overall processing performance can improve only by speeding up the execution of the normal instructions.

In the above four embodiments, each extended instruction decoding circuit in the extended processor decodes an extended operation instruction and controls the execution. However, each instruction decoding circuit in the data processor may decode the extended operation instruction and performs execution control over the extended instruction execution circuit. In such case, the instruction deciding circuit possesses the decoding and controlling function of the extended instruction decoding circuit, and a control bus is provided to transfer a control signal between the data processor and the extended processor. With this structure, DEC(E) stage is removed from the pipeline structure shown in FIGS. 8A to 8C, and DEC stage is followed by EX(E) stage or EX1(E) stage.

In the above embodiments, the processing time of the execution stage is longer than the processing times of other stages, but it should be understood that the present invention may be applied to any other stage, including the instruction decoding stage.

Also, the setting of the high-speed pitch flag 14 depends on whether the operation clock frequency exceeds or does not exceed 50 MHz in the above embodiments, but it may also depends on the value of the power source voltage applied. Generally, the delay time of a circuit is short if the power source voltage is high, while it is long if the power source voltage is low. For instance, the setting of the high-speed pitch flag 14 changes as the power source voltage changes from 3 V to 5 V.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A data processor comprising:
   processing means for processing an instruction in pipeline stages, the number of which is switchable between n and m, m being a larger number than n; and
   switching means for switching said number of pipeline stages of said processing means between n and m,
   wherein at least one pipeline stage of the processing means has a processing content that is divisible into a plurality of sequential partial operations,
   the processing means processing all partial operations in a single stage when pipeline control is performed in n-stages and processing each partial operation in a separate stage when pipeline control is performed in m-stages,
   each stage being performed by a different individual processing means, and at least one of the individual processing means including:
   a plurality of partial operation means that each execute one partial operation; and
   a plurality of transmission holding means, each of which is provided between a partial operation means and a succeeding partial operation means, the transmission holding means transmitting a processing result of a partial operation means when pipeline control is performed in n-stages and holding a processing result of a partial operation means before transmitting to the succeeding partial operation means in a next stage when pipeline control is performed in m-stages,
   whereby, in at least one individual processing means, all partial operation means operate in a same stage when pipeline control is performed in n-stages and each partial operation means operates in a different stage when pipeline control is performed in m-stages.

2. A data processor according to claim 1, wherein each of said transmission holding means comprises:
   a pipeline latch for holding partial operation result of said partial operation means; and
   a selector for selecting said partial operation result and transmitting it to the next partial operation means in the case of said n-stage pipeline processing, and for selecting an output of said pipeline latch and transmitting it to the next partial operation means in the case of said m-stage pipeline processing.

3. A data processor according to claim 2, wherein said switching means comprises:
   indicating means for indicating whether the operation clock provided for said data processor is a high-speed clock whose frequency exceeds a predetermined frequency or a low-speed clock whose frequency does not exceed said predetermined frequency; and
   pipeline control means for ordering said processing means to operate in n stages if said indicating means indicates that said operation clock is a low-speed clock, and to operate in m stages if said indicating means indicates that said operation clock is a high-speed clock.

4. A data processor according to claim 3, wherein
   said indicating means is a flip-flop, a register, or an input terminal,
   said flip-flop having a flag to indicate whether said operation clock is a high-speed clock or a low-speed clock,
   said register holding data to indicate whether said operation clock is a high-speed clock or a low-speed clock, and
   said input terminal receiving a logical value to indicate whether said operation clock is a high-speed clock or a low-speed clock.

5. A data processor according to claim 2, wherein said switching means comprises:
   indicating means for indicating whether the power source voltage supplied to said data processor is higher than a predetermined voltage or not; and
   pipeline control means for ordering said processing means to operate in n stages if said indicating means indicates that said source voltage is higher than said predetermined voltage, and to operate in m stages if said indicating means indicates that said source voltage is not higher than said predetermined voltage.

6. A data processor according to claim 5, wherein
   said indicating means is a flip-flop, a register, or an input terminal,
   said flip-flop having a flag to indicate whether said source voltage is higher than said predetermined voltage or not,
   said register holding data to indicate whether said source voltage is higher than said predetermined voltage or not, and
   said input terminal receiving a logical value to indicate whether said source voltage is higher than said predetermined voltage or not.

7. A data processor according to claim 1, further comprising an extended processor for pipelining an extended operation instruction, which has been read by said processing means, wherein said extended processor comprises:

extended processing means for processing an extended operation instruction in pipeline stages, the number of which is switchable between K and L, L being a larger number than K; and extended pipeline control means for changing said number of pipeline stages of said extended processing means using said switching means.

8. A data processor according to claim 7, wherein said extended processing means comprises:

extended instruction decoding means for decoding an extended operation instruction fetched by said instruction fetch means; and extended instruction execution means for executing said extended operation instruction either in one stage or in two stages, and said extended pipeline control means switches said extended instruction execution means between one-stage operation and two-stage operation using said switching means.

9. A data processor comprising:

processing means for processing an instruction in pipeline stages, the number of which is switchable between n and m, m being a larger number than n;

and switching means for switching said number of pipeline stages of said processing means between n and m, said switching means comprising:

indicating means for indicating whether said data processor is in a first operating condition or in a second operating condition, depending either on the frequency of the operation clock provided for said data processor or on the source voltage supplied to said data processor; and pipeline control means for ordering said processing means to operate in n-stages under said first operating condition, and for ordering said processing means to operate in m-stages under said second operating condition, said processing means having at least three pipeline stages: an instruction fetch stage, an instruction decoding stage, and an instruction execution stage, at least one of said instruction fetch stage, said instruction decoding stage, and said instruction execution stage being divided sequentially into partial operation stages, and in the case if n-stage pipeline processing, a plurality of said partial operation stages being performed in one stage, while in the case of m-stage pipeline processing, one partial operation stage being performed in one stage, each stage of said processing means is performed by individual processing means, at least one of said individual processing means comprising:

a plurality of partial operation means for performing partial operations in said partial operation stages; and a plurality of transmission holding means disposed between said partial operation stages for transmitting partial operation results in the case of said n-stage pipeline processing, and for holding and outputting said partial operation results to the next stage in the case of said m-stage pipeline processing.

10. A data processor according to claim 9, wherein each of said transmission holding means comprises:

a pipeline latch for holding a partial operation result of said partial operation means; and a selector for selecting said partial operation result and transmitting it to the next partial operation means in the case of said n-stage pipeline processing, and for selecting an output of said pipeline latch and transmitting it to the next partial operation means in the case of said m-stage pipeline processing.

11. A data processor according to claim 9, further comprising an extended processor for pipelining an extended operation instruction, which has been read by said processing means, wherein said extended processor comprises:

extended processing means for processing an extended operation instruction in pipeline stages, the number of which is switchable between K and L, L being a larger number than K;

and extended pipeline control means for changing the number of pipeline stages of said extended processing means using said switching means.

12. A data processor according to claim 11, wherein said extended processing means comprises:

extended instruction decoding means for decoding an extended operation instruction fetched by said instruction fetch means in said instruction decoding stage; and extended instruction execution means for executing said extended operation instruction either in one stage or in two stages, and said extended pipeline control means switches said extended instruction execution means between one-stage operation and two-stage operation using said switching means.

13. A data processor comprising:

processing means for processing an instruction in pipeline stages, the number of which is switchable between n and m, m being a larger number than n, said processing means including;

instruction fetch means for fetching an instruction in one stage;

instruction decoding means for decoding said fetched instruction in one stage; and instruction execution means for executing said decoded instruction either in one stage or in two stages; and switching means for switching said number of pipeline stages of said processing means between n and m, said switching means comprising;

indicating means for indicating whether said data processor is in a first operating condition or in a second operating condition depending either on the frequency of the operation clock provided for said data processor or on the source voltage supplied to said data processor, wherein said instruction execution means comprises;

first partial operation means for executing a part of an instruction decoded by said instruction decoding means;

a pipeline latch for latching an operation result of said first partial operation means;

a selector for selecting either said operation result of said first partial operation means or an output of said pipeline latch; and second partial operation means for receiving an output of said selector and executing the remaining part of said instruction, and if the operation clock frequency is lower than a predetermined frequency, said pipeline control means orders said selector to select an operation result of said first partial operation means and also orders said instruction execution means to operate in one stage, and if said operation clock frequency is high than said predetermined frequency, said pipeline control means orders said selector to select an output of said pipeline latch and also orders said instruction execution means to operate in two stages, and pipeline control means for controlling n-stage pipeline processing so that said instruction execution means operates in one stage under said first operating condition, and for controlling m-stage pipeline processing so that said instruction execution means operates in two stages under said second operating condition.

14. A data processor according to claim 13, further comprising an extended processor for pipelining an extended operation instruction, which has been read by said processing means, wherein said extended processor comprises:

extended processing means for processing an extended operation instruction in pipeline stages, the number of which is switchable between K and L, L being a larger number than K;

and extended pipeline control means for switching the number of pipeline stages of said extended processing means between K and L using said switching means, said extended processing means comprising:

extended instruction decoding means for decoding an extended operation instruction fetched by said instruction fetch means in one stage; and extended instruction execution means for executing a fetched extended operation instruction either in one stage or in two stages, and said extended pipeline control means switches said extended instruction execution means between one-stage operation and two-stage operation using said switching means.

15. A data processor comprising:

first processing means for performing pipeline processing, said first processing means including a register, and reading a first-type instruction from a memory;

second processing means for processing a second-type instruction read by said first processing means in pipeline stages, the number of which is switchable between K and L, L being a larger number than K; and switching means for switching said number of pipeline stages of said second processing means between K and L, wherein said first processing means performs a fixed number of stage pipelining, if said second processing means obtains an execution result of said second processing means in a predetermined stage, if said second processing means performs L-stage pipelining, said first processing means obtains said execution result of said second processing means in a stage that is L-minus-K stages later than said predetermined stage, and said first processing means stores said execution result into said register.

16. A data processor according to claim 15, further comprising:

an instruction bus for transferring an instruction read by said first processing means to said second processing means;

a first bus for transferring register data designated by a second-type instruction from said first processing means to said second processing means; and a second bus for transferring an execution result of said second-type instruction from said second processing means to said first processing means, and wherein said first processing means transfers said register data designated by said second-type instruction to said second processing means via said first bus, and obtains an execution result of said second processing means via said second bus.

17. A data processor according to claim 15, wherein said switching means comprises:

indicating means for indicating whether said data processor is in a first operating condition or in a second operating condition, which is determined depending either on the operation clock frequency provided for said data processor or on the source voltage supplied to said data processor; and pipeline control means for ordering said second processing means to operate in K stages under said first operating condition, and for ordering said second processing means to operate in L stages under said second operating condition.

18. A data processor according to claim 15, wherein said first processing means has a pipeline structure comprising a first stage, a second stage, a third stage, a fourth stage, and a fifth stage, and includes:

instruction fetch means for fetching an instruction from a memory in said first stage;

first decoding means for decoding a first-type instruction fetched by said instruction fetch means, and also for detecting a data address designated by a second-type instruction in said second stage;

first executing means for executing said first-type instruction decoded by said first decoding means in said third stage; and data control means for accessing a memory according to said detection result of said first decoding means in said fourth stage, and for storing and execution result into the register in said fifth stage, said second processing means comprises:

second decoding means for decoding a second-type instruction fetched by said instruction fetch means in said second stage; and second execution means for executing an instruction in said third stage in first operation mode, and for executing a part of an instruction in said third stage and the remaining part of it in said fourth stage in second operation mode, under said first operating condition, said switching means orders said second executing means to operate in said first operation mode, while under said second operating condition, said switching means orders said second executing means to operate in said second operation mode, and in said first operation mode, said data control means obtains an execution result of said second execution means in said fourth stage and writes said execution result in said register in said fifth stage, and in said second operation mode, said data control means obtains said execution result of said second execution means in said fifth stage and writes said execution result in said register also in said fifth stage.

19. A data processor according to claim 18, wherein said second execution means comprises:

first partial operation means for executing a part of an instruction decoded by said second decoding means;

transmission holding means for transmitting an execution result of said first partial operation means in said first operation mode, and for holding said execution result of said first partial operation means and outputting them to the next stage; and second partial operation means for receiving an execution result of said first partial operation means outputted from said transmission holding means, and for executing the rest of said instruction.

20. A data processor comprising:

first processing means for processing an instruction in m pipeline stages, each stage requiring the same cycle time, said first processing means, including a register, reading a first-type instruction from a memory;

second processing means for processing a second-type instruction read by said first processing means in K pipeline stages, K being a smaller number than m, one stage among said K pipeline stages being switchable between a normal operation mode which requires an integral multiple of said cycle time and a prolonged operation mode which requires an integral multiple of said cycle time;

and switching means for switching said one stage of said second processing means between said normal operation mode and said prolonged operation mode, wherein said first processing means performs a fixed number of stages pipelining, if said second processing means is in said normal operation mode, said first processing means obtains an execution result of said second processing means in a predetermined stage, if said second processing means is in said prolonged operation mode, said first processing means obtains said execution result of said second processing means in a stage at a prolonged time period later than said predetermined stage, and said first processing means stores said execution result into said register.

21. A data processor according to claim 20, further comprising:

an instruction bus for transferring an instruction read by said first processing means;

a first bus for transferring register data designated by a second-type instruction from said first processing means to said second processing means; and a second bus for transferring an execution result of said second-type instruction from said second processing means to said first processing means, wherein said first processing means transfers register data designated by said second-type instruction to said second processing means via said first bus, and obtains said execution result of said second processing means via said second bus.

22. A data processor according to claim 20, wherein said first processing means has a pipeline structure comprising a first stage, a second stage, a third stage, a fourth stage, and a fifth stage, and includes:

instruction fetch means for fetching an instruction from a memory in said first stage;

first decoding means for decoding a first-type instruction fetched by said instruction fetch means, and also for detecting a data address designated by a second-type instruction in said second stage;

first executing means for executing said first-type instruction decoded by said first decoding means in said third stage; and data control means for accessing a memory according to said detection result of said first decoding means in said fourth stage, and for storing an execution result into said register in said fifth stage, and said second processing means comprises:

second decoding means for decoding said second-type instruction fetched by said instruction fetch means in said second stage; and second execution means for, in first operation mode, executing an instruction in said cycle time in said third stage, and in second operation mode, executing an instruction in two cycle times in a prolonged third stage, and wherein under first operating condition, said switching means orders said second executing means to operate in said first operation mode, while under second operating condition, said switching means orders said second executing means to operate in said second operation mode, and in said first operation mode, said data control means obtains an execution result of said second executing means in said fourth stage and writes said execution result in said register in said fifth stage, while in said second operation mode, said data control means obtains said execution result of said second executing means in said fifth stage and writes said execution result in said register also in said fifth stage.

23. A data processor comprising:

processing means for processing an instruction in pipeline stages, the number of which is switchable between n and m, m being a larger number than n, said processing means has a pipeline structure comprising at least three pipeline stages; an instruction fetch stage, an instruction decoding stage, and an instruction execution stage, at least one stage of said instruction fetch stage, said instruction decoding stage and said instruction execution stage being divided sequentially into partial operation stages, said processing means performs all partial operations in one stage if said number of pipeline stages is n, and performs one partial operation in one stage if said number of pipeline stages is m; and switching means for switching said number of pipeline stages of said processing means between n and m, wherein each of said stages is performed by individual processing means and at least one of said individual processing means comprises;

a plurality of partial operation means for performing partial operations in said partial operation stages; and a plurality of transmission holding means disposed between said partial operation stages for transmitting partial operation results in the case of n-stage pipeline processing, and for holding and outputting said partial operation results to the next stage in the case of m-stage pipeline processing, and at least one of said individual processing means performs a plurality of partial operations in one stage in the case of said n-stage pipeline processing, and performs one partial operation in one stage in the case of said m-stage pipeline processing.

24. A data processor comprising:

processing means for processing an instruction in pipeline stages, the number of which is switchable between n and m, m being a larger number than n, said processing means comprises;

instruction fetch means for fetching an instruction in an instruction fetch stage;

instruction decoding means for decoding a fetched instruction in an instruction decoding stage; and instruction execution means for executing one instruction in one stage in first operation mode, and for executing a part of an instruction in one stage and the rest of it in the next stage in a second operation mode, said instruction execution means comprises;

first partial operation means for executing a part of an instruction decoded by said instruction decoding means;

a pipeline latch for latching an operation result of said first partial operation means;

a selector for selecting either said operation result of said first partial operation means or an output of said pipeline latch; and second partial operation means for receiving an output of said selector and executing the remaining part of said instruction according to an output of said selector, and under said first operating condition, said pipeline control means orders said selector to select an operation result of said first partial operation means so that said instruction execution means operates in said first operation mode, and that said first partial operation means and said second partial operation means perform in one stage, and under said second operating condition, said pipeline control means orders said selector to select an output of said pipeline latch so that said instruction execution means operates in said second operation mode, and that said first partial operation means performs in one stage while said second partial operation means performs in the next stage; and switching means for switching said number of pipeline stages of said processing means between n and m, said switching means comprises:

indicating means for indicating whether said data processor is in a first operating condition or in a second operating condition, depending either on the frequency of the operation clock provided for said data processor or on the source voltage supplied to said data processor; and pipeline control means for ordering said instruction execution means to operate in said first operation mode so that said processing means operates in n-stages under said first operating condition, and for ordering said instruction execution means to operate in said second operation mode so that said processing means operates in m-stages under said second operating condition.

25. A data processor comprising:

processing means for processing an instruction in pipeline stages, the number of pipeline stages used in processing is switchable between n and m, m being a larger number than n; and switching means for switching said number of pipeline stages of said processing means between n and m, including comparing means for indicating whether one of a voltage level and a system operation clock rate is equal to or greater than a predetermined value and for setting a resulting reference signal; and pipeline control means for automatically ordering said processing means to operate in n-stages, if said reference signal indicates that the voltage level or the system operation clock rate is below the predetermined value and for automatically ordering said processing means to operate in m-stages, if said reference signal indicates that the voltage level or the system operation clock rate is equal to or greater than the predetermined value.

* * * * *